US010570234B2

(12) United States Patent
Yamamoto et al.

(10) Patent No.: US 10,570,234 B2
(45) Date of Patent: Feb. 25, 2020

(54) HEAVY RELEASE ADDITIVE FOR RELEASE SHEET, ORGANOPOLYSILOXANE COMPOSITION FOR RELEASE SHEET, AND RELEASE SHEET

(71) Applicant: SHIN-ETSU CHEMICAL CO., LTD., Tokyo (JP)

(72) Inventors: Kenji Yamamoto, Annaka (JP); Tomoya Kanai, Annaka (JP); Koji Sakuta, Annaka (JP); Tsutomu Nakajima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 4 days.

(21) Appl. No.: 15/519,394

(22) PCT Filed: Oct. 9, 2015

(86) PCT No.: PCT/JP2015/078790
§ 371 (c)(1),
(2) Date: Apr. 14, 2017

(87) PCT Pub. No.: WO2016/060084
PCT Pub. Date: Apr. 21, 2016

(65) Prior Publication Data
US 2017/0233514 A1    Aug. 17, 2017

(30) Foreign Application Priority Data

Oct. 17, 2014   (JP) ................. 2014-212765

(51) Int. Cl.
| C08F 220/28 | (2006.01) |
| C09D 7/65 | (2018.01) |
| B32B 7/06 | (2019.01) |
| B32B 27/30 | (2006.01) |
| C08L 83/04 | (2006.01) |
| C09D 183/10 | (2006.01) |

(52) U.S. Cl.
CPC .............. *C08F 220/28* (2013.01); *B32B 7/06* (2013.01); *B32B 27/308* (2013.01); *C08L 83/04* (2013.01); *C09D 7/65* (2018.01); *C08F 2220/282* (2013.01); *C08L 2205/025* (2013.01); *C08L 2205/05* (2013.01); *C09D 183/10* (2013.01); *C09J 2201/606* (2013.01); *C09J 2433/005* (2013.01); *C09J 2483/005* (2013.01)

(58) Field of Classification Search
CPC ..................................................... C08G 77/20
See application file for complete search history.

(56) References Cited

U.S. PATENT DOCUMENTS

| 4,201,808 | A | 5/1980 | Cully et al. |
| 4,320,172 | A | 3/1982 | Takamizawa et al. |
| 5,750,587 | A | 5/1998 | Manzouji et al. |
| 8,933,177 | B2 | 1/2015 | Hori et al. |
| 2007/0135602 | A1 | 6/2007 | Yamahiro et al. |
| 2013/0252169 | A1* | 9/2013 | Yaguchi ............... G03G 9/1075 430/111.35 |

FOREIGN PATENT DOCUMENTS

| EP | 0 400 614 B1 | 1/1994 |
| JP | 35-13709 B | 3/1958 |
| JP | 47-32072 A | 11/1972 |
| JP | 54-162787 A | 12/1979 |
| JP | 57-48013 B2 | 10/1982 |
| JP | 58-53680 B2 | 11/1983 |
| JP | 61-13507 B2 | 4/1986 |
| JP | 64-29459 A | 1/1989 |
| JP | 64029459 | * 1/1989 |
| JP | 3-255183 A | 11/1991 |
| JP | 4-20954 B2 | 4/1992 |
| JP | 4-323284 A | 11/1992 |
| JP | 5-53183 B2 | 8/1993 |

(Continued)

OTHER PUBLICATIONS

JP 2009 237381 machine translation (2009).*
Extended European Search Report dated Feb. 16, 2018, in European Patent Application No. 15850525.5.
International Search Report, issued in PCT/JP2015/078790 (PCT/ISA/210), dated Dec. 28, 2015.
Written Opinion of the International Searching Authority, issued in PCT/JP2015/078790 (PCT/ISA/237), dated Dec. 28, 2015.

*Primary Examiner* — Kuo Liang Peng
(74) *Attorney, Agent, or Firm* — Birch, Stewart, Kolasch & Birch, LLP

(57) ABSTRACT

Provided are: a heavy release additive for a release sheet, for imparting an excellent release coating whereby heavy release force is obtained curability is not reduced, low-temperature curing is possible, and there is also minimal reduction in residual adhesion rate of a released adhesive sheet; an addition-reaction-type organopolysiloxane composition; and a release sheet. A heavy release additive for a release sheet, containing an acrylic-silicone-based graft copolymer having a weight-average molecular weight of 30,000-2,000,000 obtained by radical polymerization of an organopolysiloxane compound (A) having a radical-polymerizable group, and a radical-polymerizable monomer (B) having an acrylic group and/or a methacrylic group, the heavy release additive for a release sheet wherein the component (A) includes an organopolysiloxane compound (A1) having one radical-polymerizable group in each molecule thereof, and the component (B) includes a radical-polymerizable monomer (B2) having two or more radical-polymerizable groups in each molecule thereof.

12 Claims, No Drawings

(56) References Cited

FOREIGN PATENT DOCUMENTS

| | | |
|---|---|---|
| JP | 6-86582 B2 | 11/1994 |
| JP | 8-301954 A | 11/1996 |
| JP | 8-302306 A | 11/1996 |
| JP | 10-110156 A | 4/1998 |
| JP | 2742835 B2 | 4/1998 |
| JP | 2750896 B2 | 5/1998 |
| JP | 11-100509 A | 4/1999 |
| JP | 2932911 B2 | 8/1999 |
| JP | 11-300894 A | 11/1999 |
| JP | 11-315252 A | 11/1999 |
| JP | 3021247 B2 | 1/2000 |
| JP | 2000-34326 A | 2/2000 |
| JP | 2000-95929 A | 4/2000 |
| JP | 3459722 B2 | 10/2003 |
| JP | 2008-50549 A | 3/2008 |
| JP | 2009 237381 * | 10/2009 |
| JP | 2010-37557 A | 2/2010 |

* cited by examiner

HEAVY RELEASE ADDITIVE FOR RELEASE SHEET, ORGANOPOLYSILOXANE COMPOSITION FOR RELEASE SHEET, AND RELEASE SHEET

TECHNICAL FIELD

This invention relates to a tight release additive for use in a release sheet, which additive is a material for adjusting the release force of a release sheet, has an excellent release adjusting effect particularly when a tight release force is required, and provides a release coating that enables a pressure-sensitive adhesive sheet or the like peeled therefrom to exhibit a high subsequent adhesion ratio and that has a low peel rate dependency. The invention additionally relates to an addition reaction-type organopolysiloxane composition containing such a tight release additive, and to a release sheet produced using such a composition.

BACKGROUND ART

Release properties with respect to pressure-sensitive adhesive materials have hitherto been conferred by forming a cured coating of silicone composition on the surface of a sheet-like substrate of paper, plastic or the like.

Known methods of forming cured coatings of silicone compositions on substrate surfaces include (1) to (3) below.
(1) The method of forming a release coating on a substrate face by addition reacting an alkenyl group-containing organopolysiloxane with an organohydrogenpolysiloxane using a platinum compound as the catalyst (Patent Document 1: JP-A S47-32072).
(2) The method of forming a release coating by condensation reacting a hydroxyl group or alkoxy group-containing organopolysiloxane with an organohydrogenpolysiloxane using an organic acid metal salt such as an organotin compound as the catalyst (Patent Document 2: JP-B, S35-13709).
(3) The method of forming a release coating by using ultraviolet radiation or electron beams to induce the radical polymerization of an acrylic group-containing organopolysiloxane with a photoreaction initiator (Patent Document 3: JP-A S54-162787).)

Of the foregoing methods of forming an organopolysiloxane cured coating on a substrate surface, the method of forming a release coating via an addition reaction is widely used because the curability is excellent and this approach is able to address a variety of release property requirements from low-speed release to high-speed release.

Organopolysiloxane compositions for release liners are generally required to have various release forces according to the intended purpose. Compositions in which an alkenyl group-containing MQ resin (the M unit signifying an $R_3SiO_{1/2}$ unit (where R is a monovalent hydrocarbon group), and the Q unit signifying a $SiO_{4/2}$ unit) have been added are widely used for applications requiring a tight release force.

However, the release-tightening effect of alkenyl group-containing MQ resins is not all that high; even when a large amount is added, the target release force is sometimes not achieved. Because such alkenyl group-containing MQ resins are expensive, adding a large amount is undesirable in terms of cost. Hence, there exists a desire for compositions that, in a small amount, have an excellent release-tightening effect. Also, alkenyl group-containing MQ resins are known to have a tendency for the release force to decrease with the passage of time compared with the release force immediately after curing. Accordingly, there is a desire for compositions that do not undergo a change in the release force over time.

JP-B H05-53183 (Patent Document 4) uses an alkenyl group-containing MQ resin and an alkenyl group-free MQ resin together within an organopolysiloxane composition for a release liner. Although this does lower the change in release force over time, the release-tightening effect is inadequate.

JP No. 2750896 (Patent Document 5), by including an alkenyl group-containing resin within a solvent-based addition-curable organopolysiloxane composition for a release liner, achieves low-temperature curability and a release force that undergoes little change over time. However, release-tightening is not the object of this art, and the release force is not tight.

JP No. 2742835 (Patent Document 6) adds, to an addition reaction-type organopolysiloxane composition, the equilibration reaction product of a vinyl group-containing organopolysiloxane and an organopolysiloxane of the formula $(R_3SiO_{1/2})_a(R_2SiO)_b(RSiO_{3/2})_c(SiO_{4/2})_d$ (wherein R is a monovalent hydrocarbon group and the subscripts a, b, c and d each represent the molar fractions of the respective siloxane units, with a=0.1 to 0.6, b=0 to 0.45, c=0 to 0.3, and d=0.3 to 2.0), and can be thought of as an MQ resin having a vinyl-terminated siloxane bonded thereto.

However, no mention is made of the optimal range in the structure. In the examples, use is made of a tight release additive composition obtained by heat-treating for 5 hours at 100° C. and using potassium hydroxide as the catalyst: 40 parts by weight of polydimethylsiloxane containing vinyl groups at both ends and having a degree of polymerization of about 8,000, and 60 parts by weight of a 30 wt % toluene solution of organopolysiloxane consisting of $(R_3SiO_{1/2})_a$ units (M units) and $(SiO_{4/2})_d$ units (Q units) in a molar ratio of from 0.8 to 1.0. However, because this composition has a degree of polymerization that is too high, it cannot be used unless it is diluted in an organic solvent. Also, the release-tightening effect obtained with the addition of 10 parts by weight of the tight release additive is about 2 to 3.8-fold, which remains inadequate.

The following ways of carrying out release-tightening by adding an organopolysiloxane resin having tackiness to an addition reaction-curable organopolysiloxane composition have been disclosed.

JP-B H06-86582 (Patent Document 7) describes a tacky organopolysiloxane protective coating agent that includes the product obtained by partial dehydration condensation of a curable silicone rubber, a dihydroxy-terminated organopolysiloxane and an MQ unit-containing silicone resin. Because the silicone rubber and the silicone resin have a high viscosity or are solid, a solvent is required. This product is intended for use as a pressure-sensitive adhesive; no mention is made of its effects as a tight release additive for a release liner. Also, although the scope of the claims is broad, the body of the specification and the examples section do not mention anything other than the compounding ratio of the silicone rubber and the MQ unit-containing silicone resin.

JP-A H10-110156 (Patent Document 8) relates to an organopolysiloxane-based pressure-sensitive adhesive that uses as the base resin a mixture or partial condensation product of vinyl crude rubber and an MQ resin. Because it uses a silicone rubber, a solvent is required. No mention is made of advantageous effects as a tight release additive for a release liner.

JP-A 2010-37557 (Patent Document 9) relates to a release adjusting agent made up of an organopolysiloxane resin-organopolysiloxane condensation reaction product obtained by the condensation reaction of (a1) 100 parts b weight of an MQ resin having a molar ratio of M units to Q units of from 0.6 to 1.0 and a content of hydroxyl groups or alkoxy groups in the range of 0.3 to 2.0 wt % with (a2) from 20 to 150 parts by weight of a hydroxyl group or alkoxy group-containing acyclic polydiorganosiloxane having an average degree of polymerization of from 100 to 1,000. Relative to a comparative example in which the condensation reaction product has not been added, the release force in the examples rises only from 1.4 to 2.2-fold at a low speed (0.3 m/min), and so a sufficient release tightening effect is not obtained. The reason is presumably that the range of 0.3 to 2.0 wt % in the content of hydroxyl groups or alkoxy groups in the component (a1) used here is low, resulting in few reactive sites with component (a2), as a result of which the product does not have a structure that is sufficiently crosslinked by condensation.

As noted above, even today, resin compositions for a release liner that are made of organic resins such as polypropylene, amino alkyd, acrylic or polyisocyanate resins rather than silicone resins are often used in applications requiring a tight release force, such as casting paper (see Patent Document 10: JP-B S57-48013).

Because these resins have poor release properties, many improvements utilizing silicones have been proposed, including release agent composition containing silicone-modified alkyd resins (see Patent Document 11: JP-B S58-53680), silicone-modified acrylic resins (see Patent Document 12: JP-B S61-13507), silicone-modified alkyd resins (see Patent Document 13: JP-B H04-20954), and amino resins and silicone resins (see Patent Document 14: JP-A 2000-95929).

Owing to such numerous improvements, excellent organic resin-based tight release compositions have come to be supplied. Yet, even now, when these compositions are coated to form a release layer, there remains a need for curing and drying temperatures of 150° C. or more. This heat damages the surface of the release liner, lowering its aesthetic appearance, and also increases energy consumption, running up production costs. Hence, there exists a desire for compositions which can be cured at lower temperatures.

Recently in particular, film substrates have come to be commonly used as release materials in production processes. For example, Patent Documents 15 to 17 (JP-A H11-300894, JP No. 2932911 and JP No. 3459722) relating to the production of ceramic green sheet for use in multilayer ceramic substrates and multilayer ceramic capacitors have been disclosed.

Looking at other applications in which release films can be used, release films wherein the substrate is primarily a polyester film are used for protecting pressure-sensitive adhesive layers in, for example, liquid crystal polarizers and waveplates. In keeping with the demand for larger screens and high-definition picture quality, to achieve the processing accuracy required, there is a desire for high accuracy also in the shape of the release film. Here too, as mentioned above, heating during formation of the release layer is a factor that lowers accuracy due to deformation and thus presents a problem. Accordingly, there is a desire for release agents that can be cured at lower temperatures.

In order to resolve these problems, there exists a desire for the development of a tight release control agent that can make the release force tighter than that of MQ resin and other silicone resin-based tight release control agents, and that can be used by being compounded within an addition-curable silicone composition having excellent curability. However, in methods for tightening release by compounding, within an addition-curable silicone composition, an organic resin-based tight release composition that is outstanding in terms of its tight release force, a number of problems arise, such as a poor cure due to inhibition of the addition curing reaction, a decrease in subsequent adhesion, the inability to obtain a sufficient release-tightening effect and, owing to inadequate compatibility, poor coating appearance and anchorage. Even when attempts are made to remedy this by using a silicone-modified organic resin-based tight release composition, sufficient improvement in compatibility and the suppression of cure inhibition cannot be achieved, and the release-tightening effect by organic-modified silicones is small. For this and other reasons, no practical approach exists at present.

PRIOR ART DOCUMENTS

Patent Documents

Patent Document 1: JP-A S47-32072
Patent Document 2: JP-B S35-13709
Patent Document 3: JP-A S54-162787
Patent Document 4: JP-B H05-53183
Patent Document 5: JP No. 2750896
Patent Document 6: JP No. 2742835
Patent Document 7: JP-B H06-86582
Patent Document 8: JP-A H10-110156
Patent Document 9: JP-A 2010-37557
Patent Document 10: JP-B S57-48013
Patent Document 11: JP-B S58-53680
Patent Document 12: JP-B S61-13507
Patent Document 13: JP-B H04-20954
Patent Document 14: JP-A 2000-95929
Patent Document 15: JP-A H11-300894
Patent Document 16: JP No. 2932911
Patent Document 17: JP No. 3459722

SUMMARY OF THE INVENTION

Problems to be Solved by the Invention

In light, of the above, the object of this invention is to provide a tight release additive for use in a release sheet, which additive, when added in a small amount to an organopolysiloxane composition for a release sheet, affords an excellent release coating, that can obtain the desired tight release force, does not lower the curability, is curable at low temperatures, and moreover minimizes the decrease in the subsequent release ratio of a pressure-sensitive adhesive sheet peeled therefrom. Further objects are to provide an addition reaction-type organopolysiloxane composition containing such an additive, and a release sheet produced using such a composition.

Means for Solving the Problems

In order to achieve these objects, the inventors have attempted to make improvements to acrylic copolymers, which are conducive to structural regulation, that make such copolymers suitable for inclusion in addition curable-type silicone compositions. As a result, they have found that by using a specific silicone macromer having branched structures as a starting material, the drawbacks of conventional tight release control agents can be improved, enabling the objects of this invention to be achieved.

That is, the inventors have discovered that a number of advantages are achieved by compounding, within an addition reaction-type organopolysiloxane composition, a tight release additive for use in a release sheet, which additive comprises an acrylic-silicone graft copolymer having a weight-average molecular weight of from 30,000 to 2,000,000 that is obtained by radical polymerizing (A) an organopolysiloxane compound having a radical polymerizable group and (B) a radical polymerizable monomer having an acrylic group and/or a methacrylic group, and is characterized in that component (A) includes (A1) an organopolysiloxane compound having one radical polymerizable group per molecule and component (B) includes a radical polymerizable monomer (B2) having least two or more radical polymerizable groups per molecule. One advantage is that, in a release sheet obtained by coating the composition onto a substrate and then curing the composition to form a cured coating, an outstanding release-tightening effect is imparted. Additional advantages are that the composition has an excellent curability, a low-temperature cure is possible, and the decrease in the subsequent adhesion ratio of a pressure-sensitive adhesive sheet peeled therefrom is minimized.

Therefore, this invention provides the following tight release additive for use in a release sheet, the following organopolysiloxane composition for use in a release sheet, and the following release sheet.

[1] A tight release additive for a release sheet, comprising an acrylic-silicone graft copolymer which has a weight-average molecular weight of from 30,000 to 2,000.000 and is obtained by radical polymerizing:

(A) an organopolysiloxane compound having a radical polymerizable group, and (B) a radical polymerizable monomer having an acrylic group and/or a methacrylic group, the additive being characterized in that component (A) includes (A1) an organopolysiloxane compound having one radical polymerizable group per molecule and component (B) includes (B2) a radical polymerizable monomer having two or more radical polymerizable groups per molecule.

[2] The tight release additive for a release sheet of [1], wherein the organopolysiloxane compound (A1) having one radical polymerizable group per molecule is a radical polymerizable silicone macromonomer of general formula (1) below

[Chemical Formula 1]

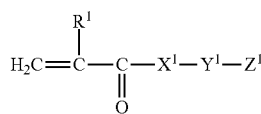

(1)

[wherein $R^1$ is a hydrogen atom or a methyl group; $X^1$ is an oxygen atom, an NH group or a sulfur atom $Y^1$ is a divalent hydrocarbon group of 1 to 12 carbon atoms which may have an intervening oxygen atom; and $Z^1$ is a monovalent silicone residue having a branched, cyclic or cage-like structure that includes at least one siloxane unit of general formula (2) or (3) below

[Chemical Formula 2]

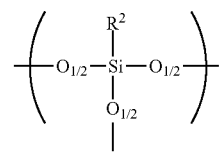

(2)

[Chemical Formula 3]

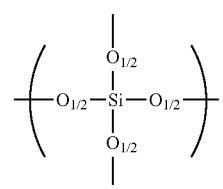

(3)

(wherein $R^2$ is a monovalent hydrocarbon group of 1 to 20 carbon atoms, and $—O_{1/2}—$ indicates bridging to another element through an oxygen atom), with the proviso that when siloxane unit (2) or (3) is adjacent to $Y^1$, it is a siloxane unit of; respectively, general formula (2') or (3') below

[Chemical Formula 3]

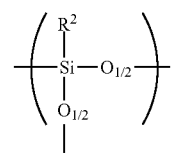

(2')

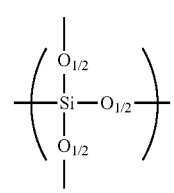

(3')

(wherein $R^2$ and $—O_{1/2}—$ are as defined above)].

[3] The tight release additive for a release sheet of [2], wherein $Z^1$ in formula (1) is a residue selected from the group consisting of monovalent silicone residues of general formulas (4a) to (4d) below

[Chemical Formula 4]

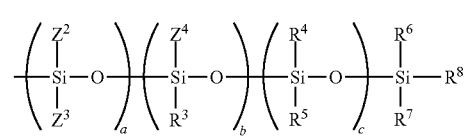

(4a)

-continued

[Chemical Formula 5]

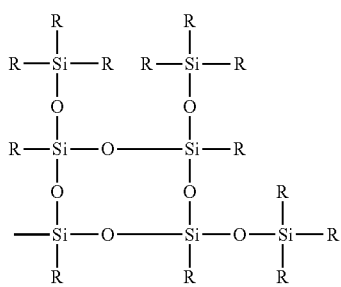
(4b)

[Chemical Formula 6]

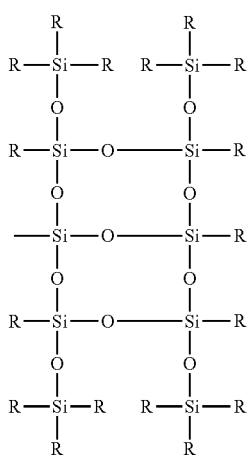
(4c)

[Chemical Formula 7]

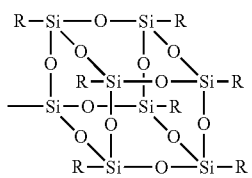
(4d)

{wherein R and $R^3$ to $R^8$ are each independently a monovalent hydrocarbon group of 1 to 20 carbon atoms, $Z^2$ to $Z^4$ are each independently a monovalent group of general formula (5) below

[Chemical Formula 8]

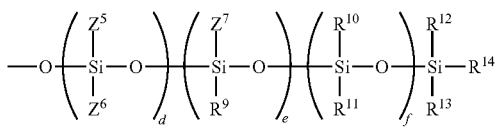
(5)

[wherein $R^9$ to $R^{14}$ are each independently a monovalent hydrocarbon group of 1 to 20 carbon atoms, $Z^5$ to $Z^7$ are each independently a monovalent group of general formula (6) below

[Chemical Formula 9]

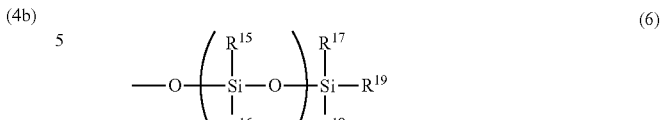
(6)

(wherein $R^{15}$ to $R^{19}$ are each independently a monovalent hydrocarbon group of 1 to 20 carbon atoms, and g is an integer of 0 or more), and the subscripts d, e and f are each integers of 0 or more], and the subscripts a b and C are each an integer of 0 or more and satisfy the condition a+b≥1}.

[4] The tight release additive for a release sheet of any of [1] to [3], wherein component (A) includes as component (A2): (A2-a) a radical polymerizable silicone macromonomer of general formula (7) below

[Chemical Formula 10]

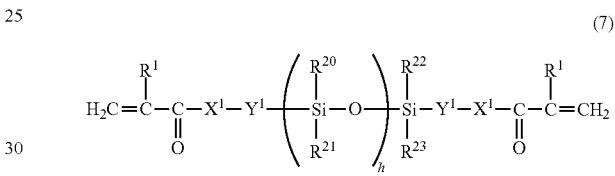
(7)

(wherein $R^1$ is a hydrogen atom or a methyl group; $X^1$ is an oxygen atom, an NH group or a sulfur atom; $Y^1$ is a divalent hydrocarbon group of 1 to 12 carbon atoms which may have an intervening oxygen atom; $R^{20}$ to $R^{23}$ are each independently a monovalent hydrocarbon group of 1 to 20 carbon atoms; and h is an integer of 0 or more) and/or (A2-b) a radical polymerizable silicone macromonomer of general formula (8) below

[Chemical Formula 11]

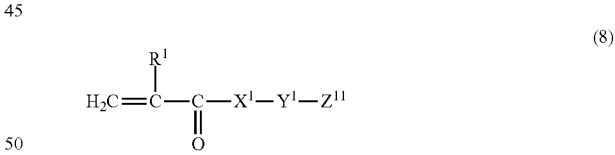
(8)

{wherein $R^1$, $X^1$ and $Y^1$ are as defined above; and $Z^{11}$ is a residue selected from the group consisting of monovalent silicone residues of formulas (9a) to (9c) below

[Chemical Formula 12]

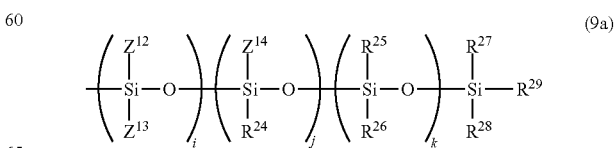
(9a)

[Chemical Formula 13]

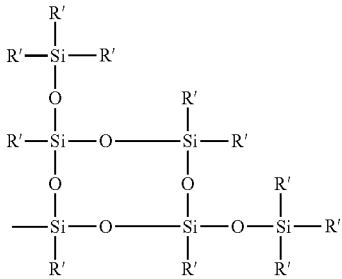
(9b)

[Chemical Formula 14]

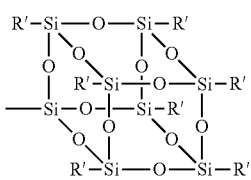
(9c)

[wherein R' and $R^{24}$ to $R^{29}$ are each independently a monovalent hydrocarbon group of 1 to 20 carbon atoms or a group of general formula (10) or (11) below

[Chemical Formula 15]

$$-Y^1-X^1-\underset{\underset{O}{\|}}{C}-\underset{\underset{R^1}{|}}{C}=CH_2 \quad (10)$$

[Chemical Formula 16]

$$-Y^1-\underset{\underset{R^1}{|}}{C}=CH_2 \quad (11)$$

(wherein $R^1$, $X^1$ and $Y^1$ are as defined above); $Z^{12}$ to $Z^{14}$ are each independently a monovalent group of general formula (12) below

[Chemical Formula 17]

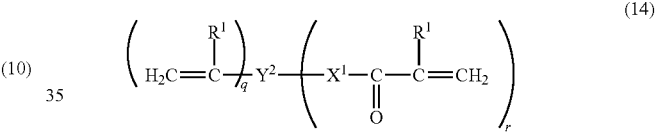
(12)

(wherein $R^{30}$ to $R^{35}$ are each independently a monovalent hydrocarbon group of 1 to 20 carbon atoms or a group of general formula (10) or (11) above, $Z^{15}$ to $Z^{17}$ are each independently a monovalent group of general formula (13) below

[Chemical Formula 17]

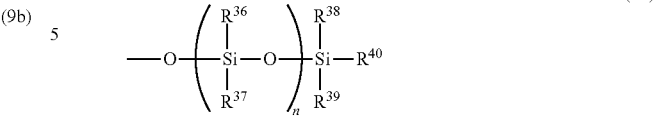
(13)

(wherein $R^{36}$ to $R^{40}$ are each independently a monovalent hydrocarbon group of 1 to 20 carbon atoms or a group of general formula (10) or (11) above, and p is an integer of 0 or more), and the subscripts l, m and n are each an integer of 0 or more) and the subscripts i, j and k are each an integer of 0 or more and satisfy the condition i+j≥1, with the proviso that at least one of R' and $R^{24}$ to $R^{40}$ is a group of formula (10) or (11)]}.

[5] The tight release additive for a release sheet of any of [1] to [4], wherein component (B) includes (B1) a (meth) acrylate which has one (meth)acrylic group per molecule and has no other aliphatic unsaturated group, alkoxysilyl group and no epoxy group.

[6] The tight release additive for a release sheet of any of [1] to [5], wherein the radical polymerizable monomer (B2) having two or more radical polymerizable groups per molecule has general formula (14) below and is included is an amount of at least 3 wt % of the combined amount of components (A) and (B)

[Chemical Formula 18]

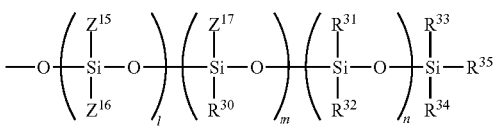
(14)

(wherein each $R^1$ is independently a hydrogen atom or a methyl group $X^1$ is independently an oxygen atom, an NH group or a sulfur atom $Y^2$ is a hydrocarbon group of 1 to 12 carbon atoms which has a valence of at least 2 and may have an intervening oxygen atom, and the subscripts q and r are each integers of 0 or more, and satisfy the condition q+r≥2).

[7] The tight release additive for a release sheet of [6], wherein the radical polymerizable monomer of component (B2) is selected from the group consisting of alkenyl group-containing methacrylates, alkenyl group-containing acrylates, polymethacrylates and polyacrylates.

[8] The tight release additive for a release sheet of any of [1] to [7], wherein component (B) includes (B3) one, two or more types of monomer selected from the group consisting of (B3-a) radical polymerizable silicone macromonomers of general formula (15) below

[Chemical Formula 19]

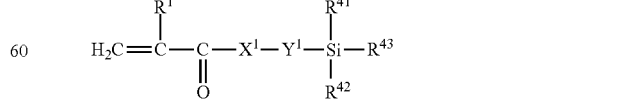
(15)

(wherein $R^1$ is a hydrogen atom or a methyl group; $X^1$ is an oxygen atom, an NH group or a sulfur atom; $Y^1$ is a divalent hydrocarbon group of 1 to 12 carbon atoms which may have an intervening oxygen atom; and $R^{41}$ to $R^{43}$ are alkoxy groups of 1 to 4 carbon atoms, acetoxy groups, isopropenyloxy groups, oxime groups, alkyl groups of 1 to 20 carbon atoms or aryl, groups of 6 to 20 carbon atoms, with at least one of $R^{41}$ to $R^{43}$ being selected from the group consisting of alkoxy groups of 1 to 4 carbon atoms and acetoxy, isopropenyloxy and oxime groups),
(B3-b) radical polymerizable monomers of general formula (16) below

[Chemical Formula 20]

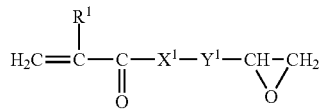
(16)

(wherein $R^1$, $X^1$ and $Y^1$ are as defined above), and
(B3-c) radical polymerizable monomers of general formula (17) below

[Chemical Formula 21]

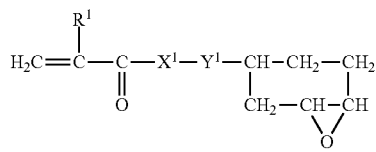
(17)

(wherein $R^1$, $X^1$ and $Y^1$ are as defined above).
[9] The tight release additive for a release sheet of [8], wherein the radical polymerizable monomer of component (B3) is selected from the group consisting of methacrylates and acrylates, and the methacrylates and acrylates here an epoxycyclohexenyl group, a glycidyl group or a methoxysilyl group.
[10] The tight release additive for a release sheet of any of [1] to [9] which is characterized in that the polymerization weight ratio (A)/(B) between component (A) and component (B) in the acrylic-silicone graft copolymer is from 30/70 to 99/1.
[11] The tight release additive for a release sheet of any of [1] to [10], wherein the weight-average molecular weight of the acrylic-silicone graft copolymer is from 50,000 to 1,000,000.
[12] An organopolysiloxane composition for a release sheet, comprising components (a) to (d) below:
 (a) 100 parts by weight of an organopolysiloxane having two or more alkenyl groups per molecule;
 (b) 1 to 70 parts by weight of, as an acrylic-silicone graft copolymer, the tight release additive for a release sheet of any of [1] to [11];
 (c) 0.1 to 50 parts by weight of an organohydrogenpolysiloxane having two or more silicon-bonded hydrogen atoms per molecule; and
 (d) a platinum group metal catalyst in a platinum metal weight, based on component (a), of from 10 to 1,000 ppm.
[13] A release sheet comprising a sheet-like substrate and a cured coating formed by applying the organopolysiloxane composition of [12] onto one or both sides of the substrate and heating.
[14] The release sheet of [13] which is characterized by exhibiting a release force of at least 1 N/10 mm when the release force of the cured coating is measured with TESA 7475 tape, and, exhibiting a release force of at least 0.15 N/10 mm when measured with Nitto 31B tape.

Advantageous Effects of the Invention

The inventive tight release additive for use in a release sheet, when added to an organopolysiloxane composition for use in a release sheet, has the advantageous effect of obtaining a very tight release force as compared with when it is not added. In addition, the curability is excellent, low-temperature cure is possible and, compared with conventional tight release additives, a release coating can be obtained for which a pressure-sensitive adhesive sheet peeled therefrom undergoes little decrease in the subsequent adhesion ratio.

EMBODIMENT FOR CARRYING OUT THE INVENTION

[Tight Release Additive for a Release Sheet]
The inventive tight release additive for use in a release sheet includes an acrylic-silicone graft copolymer which has a weight-average molecular weight of from 30,000 to 2,000,000 and is obtained by radical polymerizing components (A) and (B) below:
 (A) an organopolysiloxane compound having a radical polymerizable group, and
 (B) a radical polymerizable monomer having an acrylic group and/or a methacrylic group.
The weight-average molecular weight of the acrylic-silicone graft copolymer is from 30,000 to 2,000,000, preferably from 40,000 to 2,000,000, more preferably from 40,000 to 1,000,000, and even more preferably from 50,000 to 1,000,000. At a weight-average molecular weight below 30,000, the release-tightening effect is poor, at more than 2,000,000, the dispersibility in compositions decreases. The weight-average molecular weight is the molecular weight measured by gel permeation chromatography (GPC) against a polystyrene standard and using toluene as the developing solvent.
[Component (A)]
Component (A) in this invention is an organopolysiloxane compound having a radical polymerizable group, and includes (A1) an organopolysiloxane compound having one radical polymerizable group per molecule. Component (A) may consist solely of component (A1), or may be a mixture of component (A1) with another radical polymerizable group-containing organopolysiloxane compound.
Component (A1)
The organopolysiloxane compound having one radical polymerizable group per molecule serving as component (A1) in this invention is not particularly limited, provided it has one radical polymerizable group, such as an acrylic, methacrylic, styryl, cinnamate ester, vinyl or allyl group, per molecule. However, from the standpoint of the ease of copolymerization with the radical polymerizable monomer having an acrylic group and/or a methacrylic group serving as component (B), the ease of synthesizing the organopolysiloxane compound itself, and the advantageous effects of the tight release additive of the invention, the use of a radical polymerizable silicone macromonomer of general formula (1) below is preferred.

[Chemical Formula 22]

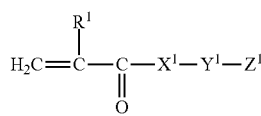
(1)

In general formula (1), $R^1$ is a hydrogen atom or a methyl group, and X is an oxygen atom, an NH group or a sulfur atom.

$Y^1$ is a divalent hydrogen group of 1 to 12, preferably 1 to 10, carbon atoms which may have an intervening oxygen atom. Illustrative examples include alkylene groups such as methylene, ethylene, propylene (trimethylene, methylethylene), butylene (tetramethylene, methylpropylene), hexamethylene and octamethylene groups; arylene groups such as a phenylene group; combinations of two or more of these groups (e.g., an alkylene/arylene group), and —$CH_2CH_2$—O—$CH_2CH_2$—, —$CH_2CH_2$—O—$CH_2CH_2$—O—$CH_2CH_2$—, —$CH(CH_3)CH_2$—$CH(CH_3)CH_2$— and —$CH_2CH_2CH_2CH_2$—O—$CH_2CH_2CH_2CH_2$—. $Y^1$ is preferably an ethylene group, a propylene group or a butylene group.

$Z^1$ is a monovalent silicone residue having a branched, cyclic or cage-like structure that includes at least one siloxane unit of general formula (2) or (3) below.

[Chemical Formula 23]

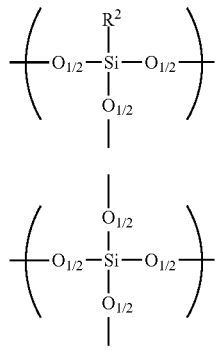
(2)

(3)

In these formulas, $R^2$ is a monovalent hydrocarbon group of 1 to 20 carbon atoms, and —$O_{1/2}$— indicates bridging to another element through an oxygen atom.

Here, $R^2$ is a monovalent hydrocarbon group having, 1 to 20, preferably 1 to 18, carbon atoms. Illustrative examples include unsubstituted monovalent hydrocarbon groups, such as alkyl groups (e.g., methyl, ethyl, propyl, isopropyl, butyl, isobutyl, tea-butyl, pentyl, neopentyl, hexyl, octyl), cycloalkyl groups (e.g., cyclohexyl) and aryl groups (e.g., phenyl, tolyl, naphthyl); and substituted monovalent hydrocarbon groups such as the foregoing groups in which some or all of the hydrogen atoms bonded to carbon atoms are substituted with hydroxyl groups, cyano groups, halogen atoms or the like, such as hydroxypropyl, cyanoethyl, 1-chloropropyl and 3,3,3-trifluoropropyl groups. $R^2$ is preferably a methyl group or a phenyl group.

When the siloxane unit of formula (2) or (3) above is adjacent to $Y^1$ in above formula (1), it is a siloxane unit of general formula (2') or (3') below.

[Chemical Formula 24]

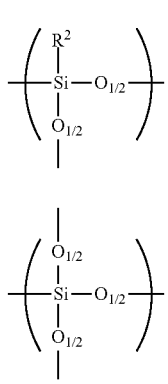
(2')

(3')

In these formulas. $R^2$ and —$O_{1/2}$— are as defined above.

$Z^1$ is preferably a residue selected from among monovalent silicone residues of general formulas (4a) to (4d) below.

[Chemical Formula 25]

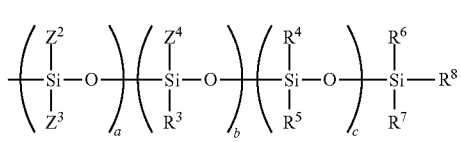
(4a)

[Chemical Formula 26]

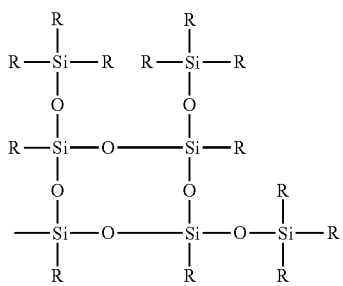
(4b)

[Chemical Formula 27]

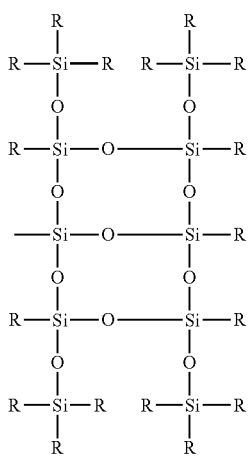
(4c)

[Chemical Formula 28]

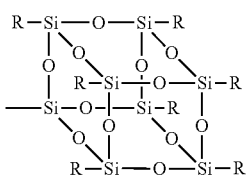
(4d)

In formulas (4a) to (4d), R and $R^3$ to $R^8$ are each independently a monovalent hydrocarbon group of 1 to 20, preferably 1 to 18, carbon atoms and can be exemplified in the same way as $R^2$ above. R is preferably a methyl group, and $R^3$ to $R^8$ are preferably methyl groups or phenyl groups.

In formula (4a), the subscripts a, b and c are each integers of 0 or more. It is preferable for a to be an integer from 0 to 100, b be an integer from 0 to 100 and c to be an integer from 0 to 50, and more preferable for a to be an integer from 0 to 50, h to be an integer from 0 to 50, and c to be an integer from 0 to 40. The sum a+b is an integer of at least 1, and preferably from 1 to 50. In a linear structure in which a+b=0, a release-tightening effect is difficult to obtain; hence, it is preferable for a≠0, with the subscript a being an integer of 1 or more. In addition, the sum a+b+c is an integer that is preferably from 1 to 50, more preferably from 1 to 20, and even more preferably from 1 to 10. When a+b+c is 0, the solubility in the composition decreases; when a+b+c is more than 50, the release-tightening effect is small.

$Z^2$ to $Z^4$ are each independently a monovalent group of general formula (5) below.

[Chemical Formula 29]

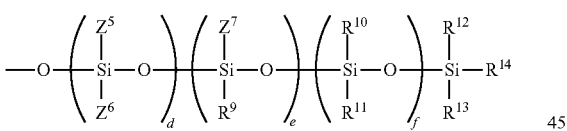
(5)

In formula (5), $R^9$ to $R^{14}$ are each independently a monovalent hydrocarbon group of 1 to 20, preferably, 1 to 18, carbon atoms and can be exemplified in the same way as $R^2$ above. $R^9$ to $R^{14}$ are preferably methyl groups or phenyl groups.

The subscripts d, e and f are each integers of 0 or more. It is preferable for d to be an integer from 0 to 50, e to be an integer from 0 to 50 and 1 to be an integer from 0 to 30, and more preferable for d to be an integer from 0 to 30, e to be an integer from 0 to 30, and f to be an integer from 0 to 20. The sum d+e+f is an integer that is preferably from 0 to 30, more preferably from 0 to 10, and even more preferably from 0 to 5. When d+e+f is more than 30, the release-tightening effect is small.

$Z^5$ to $Z^7$ are each independently a monovalent group of general formula (6) below.

[Chemical Formula 30]

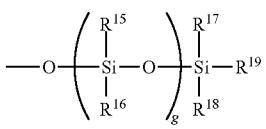
(6)

In formula (6), $R^{15}$ to $R^{19}$ are each independently a monovalent hydrocarbon group of 1 to 20, preferably 1 to 18, carbon atoms, and can be exemplified in the same way as $R^2$ above. $R^{15}$ to $R^{19}$ are preferably methyl groups or phenyl groups.

The subscript g is an integer of 0 or more, preferably 0 to 30, more preferably 0 to 10, and still more preferably 0 to 5.

The weight-average molecular weight of component (A1) is preferably from 300 to 5,000, and especially from 300 to 3,000.

Illustrative examples of component (A1) include those show below. In these examples, $R^0$ is a methyl group or a phenyl group.

[Chemical Formula 31]

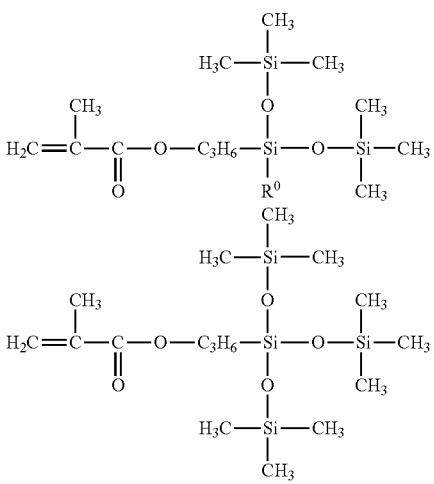

[Chemical Formula 32]

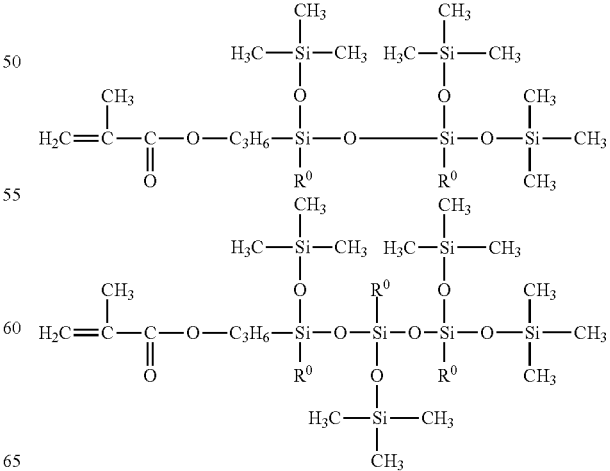

-continued

[Chemical Formula 33]

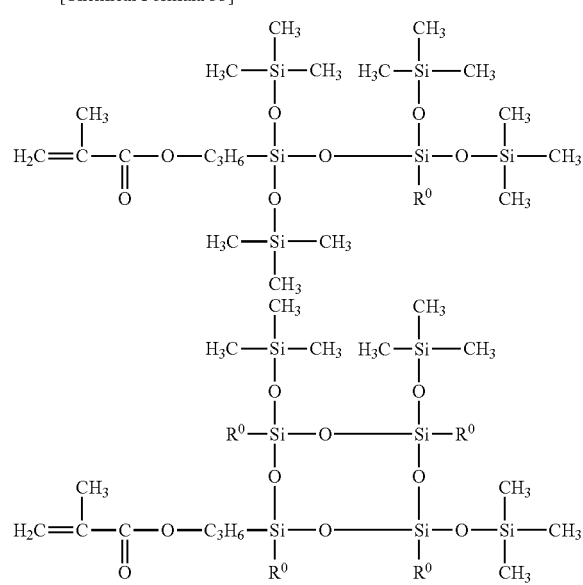

[Chemical Formula 34]

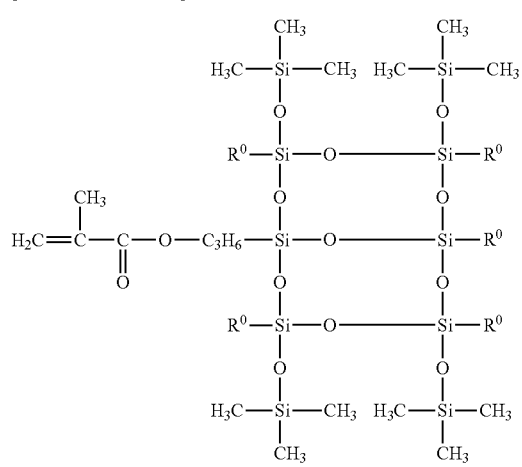

[Chemical Formula 35]

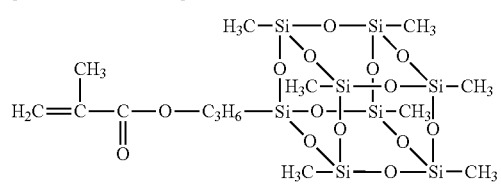

Component (A2)

In this invention, in addition to component (A1) a diacrylic-terminated macromonomer (A2) may be used together as the radical polymerizable group-containing organopolysiloxane compound serving as component (A). By setting the number of radical polymerizable groups per molecule in the radical polymerizable group-containing organopolysiloxane compound of component (A) to two or more, the dispersibility and release-tightening effect of the acrylic-silicone graft copolymer can be changed.

That is, when radical polymerization is carried out without using component (A2), i.e., using component (A1) alone, an acrylic-silicone type graft copolymer having organopolysiloxane groups only on side chains is obtained. However, when component (A2) is used together with component (A1), siloxane structures can be inserted into the acrylic polymer backbone within the acrylic-silicone graft copolymer, making it possible to further change the structure of the polymer skeleton to be synthesized, and thus enabling the breadth of modification possible in the dispersibility and the release-tightening effect to be enlarged.

Acrylic groups and methacrylic groups are suitable as the radical functional groups in component (A2). However, in order to control the molecular weight of the polymer that forms and the number of branched structures therein by altering the radical reactivities of the functional groups, it is also possible to use alkenyl groups such as vinyl or propenyl groups, or to use instead, for example, maleic anhydride groups, maleimide groups or styryl groups.

A radical polymerizable silicone macromonomer (A2-a) of general formula (7) below or a radical polymerizable silicone macromonomer (A2-b) of general formula (8) below may be used as component (A2). When component (A2-a) is used, an acrylic-silicone graft copolymer in which linear siloxane structures have been incorporated can be obtained. When component (A2-b) is used, an acrylic-silicone graft copolymer in which branched siloxane structures have been introduced can be obtained.

Component (A2-a)

Component (A2-a) is a radical polymerizable silicone macromonomer of general formula (7) below.

[Chemical Formula 36]

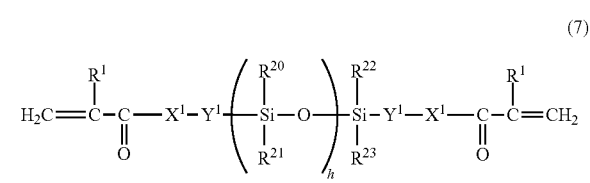

(7)

In formula (7), $R^1$, $X^1$ and $Y^1$ are as defined above.

$R^{20}$ to $R^{23}$ are each independently a monovalent hydrocarbon group of 1 to 20, preferably 1 to 18, carbon atoms that can be exemplified in the same way as $R^2$ above. $R^{20}$ to $R^{23}$ are preferably methyl groups or phenyl groups.

The subscript h is an integer that is 0 or more, preferably from 0 to 50, and more preferably from 0 to 30.

Component (A2-b)

Component (A2-b) is a radical polymerizable silicone macromonomer of general formula (8) below wherein, in the $Z^1$ group in formula (1), at least one of $R^2$ to $R^{19}$ has been replaced with a radical polymerizable group.

[Chemical Formula 37]

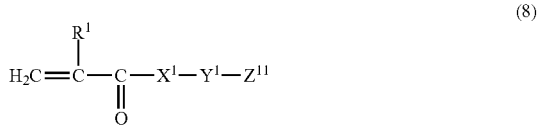

(8)

In formula (8), $R^1$, $X^1$ and $Y^1$ are as defined above.

$Z^{1'}$ is selected from among monovalent silicone residues of general formulas (9a) to (9c) below.

[Chemical Formula 38]

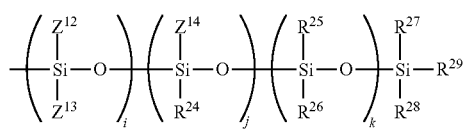
(9a)

[Chemical Formula 39]

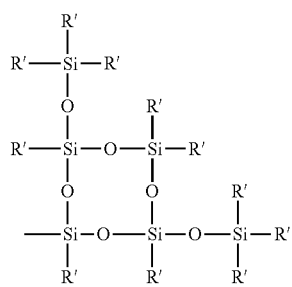
(9b)

[Chemical Formula 40]

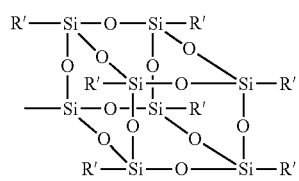
(9c)

In formulas (9a) to (9c), R' and $R^{24}$ to $R^{29}$ are each independently a monovalent hydrocarbon group of 1 to 20 carbon atoms or a group of general formula (10) or (11) below

[Chemical Formula 41]

$$—Y^1—X^1—\underset{\underset{O}{\|}}{\overset{\overset{R^1}{|}}{C}}—C=CH_2 \qquad (10)$$

$$—Y^1—\overset{\overset{R^1}{|}}{C}=CH_2 \qquad (11)$$

In these formulas, $R^1$, $X^1$ and $Y^1$ are as defined above.

Here. R' and $R^{24}$ to $R^{29}$ are monovalent hydrocarbon groups of 1 to 20, preferably 1 to 18, carbon atoms, and can be exemplified in the same way as $R^2$ above. R' is preferably a methyl group or a phenyl group, and $R^{24}$ to $R^{29}$ are preferably methyl groups or phenyl groups.

In formula (9a), the subscripts i, j and k are each an integer of 0 or more. It is preferable fix i to be an integer from 0 to 100, j to be an integer from 0 to 100 and k to be an integer from 0 to 50, and more preferable for i to be an integer flora 0 to 50, j to be an integer from 0 to 50 and k to be an integer from 0 to 30. These subscripts satisfy the condition i+j≥1.

$Z^{12}$ to $Z^{14}$ are each independently a monovalent group of general formula (12) below.

[Chemical Formula 42]

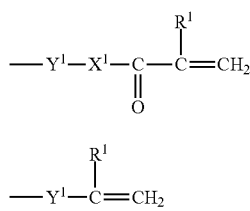
(12)

In formula (12), $R^{30}$ to $R^{35}$ are each independently a monovalent hydrocarbon group of 1 to 20 carbon atoms or a group of above general formula (10) or (11). Monovalent hydrocarbon wows of 1 to 20, preferably 1 to 18, carbon atoms can be exemplified in the same way as $R^2$ above. $R^{30}$ to $R^{35}$ are preferably methyl groups or phenyl groups.

The subscripts l, m and n are each integers of 0 or more. It is preferable for the subscript l to be an integer from 0 to 50, m to be an integer from 0 to 50 and n to be an integer from 0 to 30, and more preferable for the subscript l to be an integer from 0 to 30, m to be an integer from 0 to 30 and n to be an integer from 0 to 20.

$Z^{15}$ to $Z^{17}$ are each independently a monovalent group of general formula (13) below.

[Chemical Formula 43]

$$—O{\left(\underset{\underset{R^{37}}{|}}{\overset{\overset{R^{36}}{|}}{Si}}—O\right)}_p\underset{\underset{R^{39}}{|}}{\overset{\overset{R^{38}}{|}}{Si}}—R^{40} \qquad (13)$$

In formula (13), $R^{36}$ to $R^{40}$ are each independently a monovalent hydrocarbon group of 1 to 20 carbon atoms or a group of general formula (10) or (11). Monovalent hydrocarbon groups of 1 to 20, preferably 1 to 18, carbon atoms can be exemplified in the same way as for $R^2$ above. $R^{36}$ to $R^{40}$ are preferably methyl groups or phenyl groups.

The subscript p is an integer of 0 or more, preferably from 0 to 30, more preferably from 0 to 10, and even more preferably from 0 to 5.

In formula (8), at least one, and preferably from one to five, R' residues, and at least one, and preferably from one to live, $R^{24}$ to $R^{40}$ residues are groups of formula (10) or (11).

The weight-average molecular weight of component (A2) is preferably from 200 to 10,000, and more preferably from 200 to 5,000.

Illustrative examples of component (A2) include those shown below.

[Chemical Formula 44]

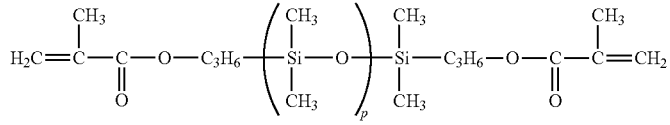

-continued

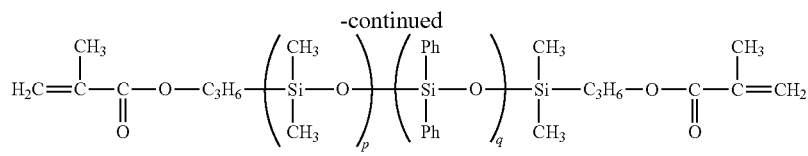

In the above formulas, Ph is a phenyl group, the subscript p is an integer from 0 to 130, and the subscript q is an integer from 0 to 40.

[Chemical Formula 45]

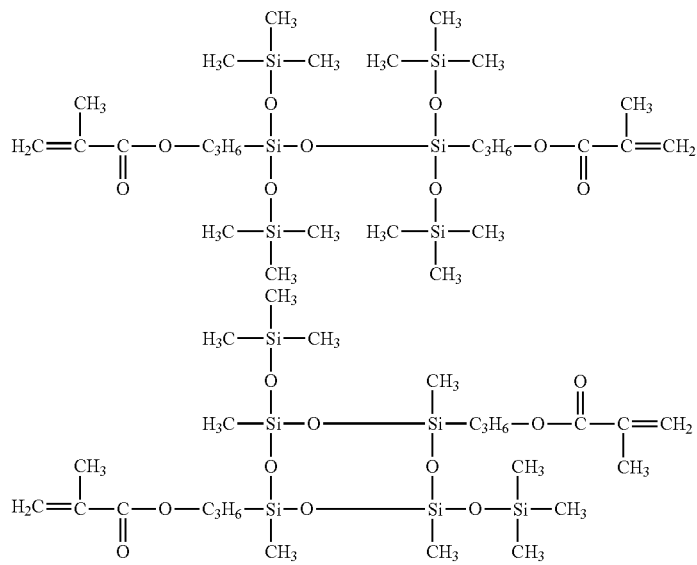

[Chemical Formula 46]

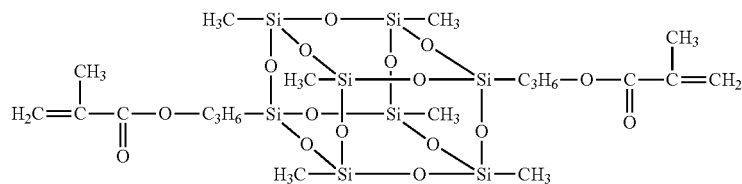

Component (A2) may be of one type used alone, or two or more types may be used in admixture.

When component (A2) is used, the content thereof is preferably from 1 to 30 wt %, and more preferably from 1 to 20 wt %, of component (A). At less than 1 wt %, substantially no change in dispersibility may be observable. At more than 30 wt %, synthesis of a high-molecular-weight polymer may be difficult.

The content of component (A1) is preferably from 60 to 100 wt %, and more preferably from 80 to 100 wt %, of component (A).

[Component (B)]

The radical polymerizable monomer having an acrylic group and/or a methacrylic group that serves as component (B) in this invention is not particularly limited, provided it is a compound having a (meth)acrylic group. For example, it can be exemplified by (B1) a (meth)acrylate which has one (meth)acrylic group per molecule and has no other aliphatic unsaturated group, no alkoxysilyl group and no epoxy group.

Illustrative examples of the acrylates and methacrylates of component (B1) include ester compounds of (meth)acrylic acid, such as methyl (meth)acrylate, ethyl (meth)acrylate, n-butyl (meth)acrylate, 2-ethylhexyl (meth)acrylate, lauryl (meth)acrylate, stearyl (meth)acrylate, cyclohexyl (meth) acrylate, benzyl (meth)acrylate, isobornyl (meth)acrylate, trifluoropropyl (meth)acrylate, perfluorobutylethyl (meth) acrylate and perfluorooctylethyl (meth)acrylate; hydroxyl group-containing radical polymerizable monomers such as 2-hydroxyethyl (meth)acrylate, 2-hydroxypropyl (meth) acrylate and 2-hydroxybutyl (meth)acrylate; radical polymerizable silane compounds such as γ-methacryloxypropyl trimethylsilane, γ-methacryloxypropyl triethylsilane, γ-methacryloxypropyl tributylsilane, γ-acryloxypropyl trimethylsilane, γ-acryloxypropyl triethylsilane, styryl trimethylsilane, styryl triethylsilane and α-methylstyryl trimethylsilane; polyoxyalkylene group-containing radical polymerizable monomers, and glycerol (meth)acrylate.

Taking into consideration the release-tightening effect and the high subsequent adhesion ratio effect that are industrially obtained by way of the tight release additive of the invention, it is preferable for an alkyl (meth)acrylate having from 1 to 30 carbon atoms, and more preferable for methyl methacrylate, to be included as the radical polymerizable monomer serving as component (B1).

Component (B1) may be of one type used alone, or two or more types may be used in admixture.

When component (B1) is used, the content thereof is preferably from 0 to 30 wt %, and more preferably from 3 to 20 wt %, of the combined amount of components (A) and (B). Too high a content may lower the solubility in compositions, whereas too low a content may make it difficult to obtain a copolymer having a high molecular weight.

Component (B2)

In this invention, it is essential to include a polyacrylate (B2) as the radical polymerizable monomer having an acrylic group and/or a methacrylic group that serves as component (B).

Although the molecular weight of the acrylic-silicone graft copolymer is, as noted above, an important factor that determines the dispersibility in the composition and the release-tightening effects, the next most important factor is the structure of the acrylic polymer chain serving as the polymer backbone. The structure of the acrylic polymer chain is determined by selection of the radical polymerizable monomers that are used as the starting materials. The radical polymerizable monomers indicated as component (B1) have only one radical polymerizable group, and so the structures of the acrylic polymer chains formed using these are entirely linear.

Hence, by additionally including, as component (B2), the monomer having at least two radical polymerizable groups per molecule shown in general formula (14) below and effecting radical polymerization, branched structures can be introduced onto the acrylic polymer backbone of the acrylic-silicone graft copolymer.

[Chemical Formula 47]

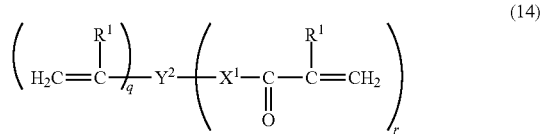

(14)

In formula (14), $R^1$ and $X^1$ are as defined above.

$Y^2$ is a divalent hydrocarbon group of 1 to 12, preferably 1 to 10, carbon atoms which may have an intervening oxygen atom. Illustrative examples of $Y^2$ include methylene and methine groups, tetravalent carbon, ethylene; ethylidene and ethylidyne groups, the tetravalent group obtained by removing four hydrogen atoms from ethane, propylene groups (trimethylene and methylethylene groups), the propylidene and propylidyne groups, the tetravalent group obtained by removing four hydrogen atoms from propane, butylene groups (tetramethylene and methylpropylene groups), the butylidene and butylidyne groups, the tetravalent group obtained by removing four hydrogen atoms from butane, alkylene groups such as hexamethylene and octamethylene groups, divalent to hexavalent groups obtained by removing 2 to 6 hydrogen atoms from an alkane, arylene groups such as the phenylene group, trivalent to hexavalent groups obtained by removing 3 to 6 hydrogen atoms from aromatic hydrocarbons, and arylalkyene and alkylarylene groups; combinations of two or more of the foregoing groups; divalent to hexavalent groups obtained by removing 2 to 6 hydrogen atoms from alkyl-substituted aromatic hydrocarbons; and groups which may include ether, carbonyl, ester, urethane and amide linkages within the structures of these groups, such as —CH$_2$CH$_2$—O—CH$_2$CH$_2$—, —CH$_2$CH$_2$—O—CH$_2$CH$_2$—O—CH$_2$CH$_2$—, —CH(CH$_3$)CH$_2$—O—CH(CH$_3$)CH$_2$— and —CH$_2$CH$_2$CH$_2$CH$_2$—O—CH$_2$CH$_2$CH$_2$CH$_2$—.

The subscripts q and r are each integers of 0 or more, with the subscript q preferably being an integer from 0 to 3 and the subscript r preferably being an integer from 0 to 3. The sum q+r which represents the valence of $Y^2$ is an integer of 2 or more preferably 2 or 3, and more preferably 2. When q+r is less than 2, branched structures cannot be introduced; as the value of q+r increases above 3, it becomes more difficult to synthesize a high-molecular-weight polymer.

Component (B2) is exemplified by alkenyl group-containing methacrylates, alkenyl group-containing acrylates, polymethacrylates and polyacrylates. Illustrative examples include allyl methacrylate, ethylene glycol dimethacrylate and trimethylolpropane triacrylate. Alkenyl group-containing methacrylates are preferred, and allyl methacrylate is more preferred.

Component (B2) may be of one type used alone, or two or more types may be used in admixture.

The content of component (B2), based on the combined amount of components (A) and (B), is preferably at least 1 wt %, more preferably from 1 to 30 wt %, and even more preferably from 2 to 20 wt %. At less than 1 wt %, substantially no change in dispersibility can be observed; at more than 30 wt %, synthesis of a high-molecular-weight polymer may be difficult.

Component (B3)

In this invention, the radical polymerizable monomers having an acrylic group and/or a methacrylic group that serve as component (B) may additionally include an adhesion monomer (B3).

Organopolysiloxane compositions for release sheets are coated onto various types of substrates where they form a cured coating. With the addition of the tight release additive of the invention to such a composition, the release force becomes tighter and so a larger tensile stress acts upon the interface between the substrate and the cured coating during peeling of a pressure-sensitive adhesive layer from the surface of the cured coating on the release sheet. To withstand such tensile stress, having the cured coating adhere strongly to the substrate makes the release sheet more useful. In cases where the composition is coated onto a plastic film-type substrate, adherence to which is particularly difficult to achieve, it is desirable to impart the tight release additive itself with an adherence-enhancing effect.

Examples of adhesion monomers (B3) useful for imparting an adherence-enhancing effect include: (B3-a) alkoxysilyl group-containing radical polymerizable monomers of general formula (15) below, (B3-b) epoxy group-containing radical polymerizable monomers of general formula (16) below, and (B3-c) epoxycyclohexyl group-containing radical polymerizable monomers of general formula (17) below.

Component (B3-a)

Component (B3-a) is an alkoxysilyl group-containing radical polymerizable monomer of general formula (15) below.

[Chemical Formula 48]

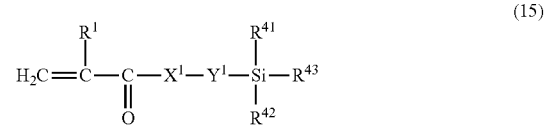

(15)

In formula (15), $R^1$, X1 and $Y^1$ are as defined above.

$R^{41}$ to $R^{43}$ are alkoxy groups of 1 to 4 carbon atoms, acetoxy groups, isopropenyloxy groups, oxime groups, alkyl groups of 1 to 20 carbon atoms or aryl groups of 6 to 20 carbon atoms. Examples of alkoxy groups of 1 to 4 carbon atoms include methoxy ethoxy, propoxy and butoxy groups. Examples of alkyl soups of 1 to 20, preferably 1 to 10, carbon atoms include methyl, ethyl, propyl, isopropyl, butyl, isobutyl, tert-butyl, pentyl, neopentyl, hexyl and octyl groups. Examples of aryl groups of 6 to 20, preferably 6 to 15, carbon atoms include phenyl, tolyl, xylyl and naphthyl groups. At least one, and preferably two or more, of $R^{41}$ to $R^{43}$ is a group selected from among alkoxy groups of 1 to 4 carbon atoms and acetoxy, isopropenyloxy and oxime groups, and is preferably an alkoxy acetoxy group.

Component (B3-b)

Component (B3-b) is an epoxy group-containing radical polymerizable monomer of general formula (16) below

[Chemical Formula 49]

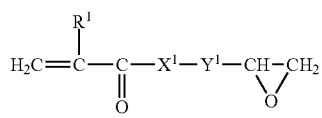

(16)

(wherein $R^1$, $X^1$ and $Y^1$ are as defined above).

Component (B3-c)

Component (B3-c) is an epoxycyclohexyl group-containing radical polymerizable monomer of general formula (17) below

[Chemical Formula 50]

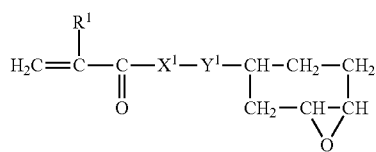

(17)

(wherein $R^1$, $X^1$ and $Y^1$ are as defined above).

Illustrative examples of these component (B3) monomers include epoxy group-containing radical polymerizable monomers such as glycidyl (meth)acrylate, β-methylglycidyl (meth)acrylate and 3,4-epoxycyclohexylmethyl (meth)acrylate; and radical polymerizable silane compounds such as γ-methacryloxypropyltrimethoxysilane, γ-methacryloxypropylmethyldimethoxysilane, γ-methacryloxypropyldimethylmethoxysilane, γ-methacryloxypropyltriethoxysilane, γ-methacryloxypropylmethyldiethoxysilane, γ-methacryloxypropyltributoxysilane, γ-methacryloxypropyltriisopropenoxysilane, γ-acryloxypropyltrimethoxysilane, acryloxymethyltrimethoxysilane, γ-acryloxypropyltrimethoxysilane, γ-acryloxypropylmethyldiethoxysilane, styryltrimethoxysilane, styryltriethoxysilane and α-methylstyryltrimethoxysilane.

Component (B3) may be of one type used alone, or two or more types may be used in admixture.

When component (B3) is used, the content thereof is preferably at least 1 wt %, more preferably from 1 to 30 wt %, and even more preferably from 2 to 25 wt %, based on the combined amount of components (A) and (B), When the content is too high, the curability may decrease. On the other hand, when the content is too low, adhesion-enhancing effects may not be achievable.

It is critical for component (B) to include component (B2), although two or more types of component (B) may be used by mixing in above component (B1) and/or component (B3).

[Component (A)/Component (B) Ratio, and Synthesis]

The polymerization weight ratio (A)/(B) between (A) the organopolysiloxane compound having one radical polymerizable group per molecule and (B) the radical polymerizable monomer is preferably in the range of 30/70 to 99/1, and more preferably from 40/60 to 90/10. When the polymerization weight ratio (A)/(B) is smaller than 30/70, the amount of the silicone component becomes low, as a result of which the compatibility with organopolysiloxane compositions decreases. On the other hand, when the ratio is larger than 99/1, the release-tightening effect sometimes decreases.

Where necessary, other monomers may be copolymerized, provided that doing so does not detract from the advantageous effects of the invention.

The copolymerization of monomer starting materials which include (A) a radical polymerizable group-containing organopolysiloxane compound and (B) a radical polymerizable monomer may be carried out by a known method of synthesis, such as that described in JP No. 2704730. For example, synthesis may be carried out by solution polymerization, emulsion polymerization, suspension polymerization or bulk polymerization in the presence of a radical polymerization initiator such as benzoyl peroxide, lauroyl peroxide, tert-butylperoxy-2-ethylhexanoate or dimethyl-2, 2'-azobis(2-methylpropionate).

Of these, solution polymerization is more preferred as the synthesis method because the molecular weight modification of the resulting copolymer is easy. The solvent used in synthesis may be one or a mixture of two or more of the following: aromatic hydrocarbons such as toluene and xylene, ketones such as methyl ethyl ketone and methyl isobutyl ketone, esters such as ethyl acetate and isobutyl acetate, and alcohols such as isopropanol and butanol.

The polymerization reaction is suitably regulated by the type of radical polymerization initiator used and the reactivity of the radical polymerizable monomer, although the reaction may be carried out within a temperature range of generally 50 to 180° C., and preferably 60 to 120° C. Reaction is preferably brought to completion in a reaction time of about 5 to 10 hours.

Aside from the above-described copolymer, the tight release additive for release sheets of the invention may also include, within a range that does not detract from the advantageous effects of the invention, ingredients which have a tight release controlling effect, examples of which include silicone resins or oligomers such as MQ resins, MT resins and DT resins. Organic resins such as acrylic-modified silicone resins, silicone-modified acrylic resins, acrylic resins and polyester resins may be included in order to enhance the coatability and film formability; silane coupling agents, oligomers thereof and modified silicone oils, may be included in order to enhance wettability and leveling properties; fillers such as silica, talc, quartz powder, glass powder, silicone powder and plastic powder may be added in order to increase the strength and durability of the cured coating; and solvents such as toluene, methyl ethyl ketone (MFK), heptane and ethyl acetate may be included in order to enhance the solubility or dispersibility.

[Organopolysiloxane Composition]

It is desirable for the inventive tight release additive for a release sheet that includes the above-described acrylic-silicone graft copolymer to be used in an organopolysiloxane composition for a release sheet that includes components (a) to (d) below and, optionally, component (e) below:
(a) an organopolysiloxane having two or more alkenyl groups per molecule;
(b) a tight release additive for a release sheet containing the above-described acrylic-silicone graft copolymer;
(c) an organohydrogenpolysiloxane having two or more silicon-bonded hydrogen atoms per molecule;
(d) a platinum group metal catalyst; and
(e) as an optional ingredient, a solvent or water for dilution.

[(a) Alkenyl Group-Containing Organopolysiloxane]

Component (a) is an organopolysiloxane having two or more alkenyl groups per molecule. A linear organopolysiloxane of general formula (18) below containing alkenyl groups on the ends and or side chains thereof is preferred.

[Chemical Formula 51]

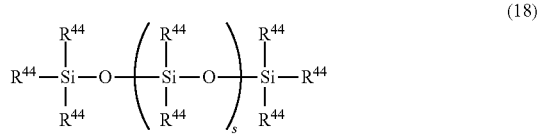

(18)

In formula (18), $R^{44}$ represents like or unlike groups selected from among substituted or unsubstituted monovalent hydrocarbon groups of 1 to 20 carbon atoms which have no aliphatic unsaturated bonds and alkenyl groups of 2 to 12 carbon atoms which may have an intervening oxygen atom, with at least two $R^{44}$ groups being alkenyl groups.

Illustrative examples of monovalent hydrocarbon groups of 1 to 20 carbon atoms which have no aliphatic unsaturated bonds include substituted or unsubstituted monovalent hydrocarbon groups of 1 to 10 carbon atoms selected from among alkyl groups of preferably 1 to 6 carbon atoms, such as methyl, ethyl, propyl and butyl groups; cycloalkyl groups of preferably 5 to 8 carbon atoms, such as cyclohexyl; aryl groups of preferably 6 to 10 carbon atoms, such as phenyl and tolyl groups; aralkyl groups of preferably 7 to 10 carbon atoms, such as benzyl; and any of these groups in which some or all hydrogen atoms bonded to carbon atoms are substituted with, for example, hydroxyl groups, cyano groups or halogen atoms, such as hydroxypropyl, cyanoethyl, 1-chloropropyl and 3,3,3-trifluoropropyl groups. Alkyl groups and aryl groups are preferred, particularly from the standpoint of the release properties.

The alkenyl group of 2 to 12 carbon atoms which may have an intervening oxygen atom is preferably a group represented by —$(CH_2)_t$—CH=$CH_2$ (wherein t is an integer from 0 to 10). Illustrative examples include vinyl, propenyl, butenyl, hexenyl, octenyl and decenyl groups. Alternatively, an ether bond may be included on the methylene chain, examples of such groups being —$(CH_2)_2$—O—$CH_2$—CH=$CH_2$ and —$(CH_2)_3$—O—$CH_2$—CH=$CH_2$.

At least two, and preferably from 2 to 2,000, $R^{44}$ coups are alkenyl groups. The alkenyl group content in the organopolysiloxane is preferably from 0.0001 to 0.5 mol/100 and especially from 0.0002 to 0.4 mol/100 g. When the amount of alkenyl groups is too low, the curability may be inadequate; when it is too high, the pot life may shorten.

The alkenyl groups may be bonded to silicon atoms at the ends of the molecular chain, may be bonded to silicon atoms somewhere along the molecular chain (non-terminal silicon atoms), or may be bonded to both.

The subscript s is a number which sets the viscosity of the alkenyl group-containing organopolysiloxane at 25° C. to from 50 mPa·s to a viscosity as a 30% toluene solution of 50,000 mPa·s and especially from 50 mPa·s to a viscosity as a 30% toluene solution of 30,000 mPa·s. The viscosity can be measured with a rotational viscometer (the same applies below).

[(b) Tight Release Additive]

Component (b) is a tight release additive for use in release sheets that includes the above-described acrylic-silicone graft copolymer. By including this component, an excellent release coating can be provided which can achieve the desired tight release force, does not lower the curability and is able to cure at low temperature, and moreover minimizes the decline in the subsequent adhesion ratio of a pressure-sensitive adhesive sheet peeled therefrom.

The content of component (b) is such a to set the amount of the acrylic-silicone graft copolymer per 100 parts by weight of component (a) to from 1 to 70 parts by weight, preferably from 3 to 70 parts by weight, and more preferably from 5 to 50 parts by weight. When the component (b) content is too low, the release force tightening effect is small; when it is too high, the curability decreases.

[(c) Organohydrogenpolysiloxane]

The organohydrogenpolysiloxane of component (c) has at least two silicone-bonded hydrogen atoms (also referred to below as "SiH groups") per molecule, and forms a cured coating via addition reactions between these SiH groups and alkenyl groups in component (a). This component (c) is exemplified by compounds of average compositional formula (19) below.

(19)

In this formula, $R^{45}$ is a monovalent hydrocarbon group that has no aliphatic unsaturated bonds. Also, the subscript u is a positive number from 0 to 2.7 and the subscript v is a positive number from 0.3 to 3, provided that the condition u+v≤3 is satisfied.

In formula (19), $R^{45}$ is a monovalent hydrocarbon group that has no aliphatic unsaturated bonds. Illustrative examples include alkyl groups of preferably 1 to 6 carbon atoms, such as methyl, ethyl, propyl and butyl groups; cycloalkyl groups of preferably 5 to 8 carbon atoms, such as cyclohexyl; aryl groups of preferably 6 to 10 carbon atoms, such as phenyl and tolyl groups; and aralkyl groups of preferably 7 to 10 carbon atoms, such as benzyl. From the standpoint of increasing the addition reaction rate, a methyl group is preferred.

The subscript u is a positive number that is preferably from 0 to 2, and more preferably from 0.4 to 2. The subscript v is a positive number that is preferably from 0.1 to 2, and more preferably from 0.1 to 1.5. The sum u+v is not more than 3, and is especially from 0.5 to 2.7.

Exemplary organohydrogenpolysiloxanes of formula (19) include polymers copolymers having at least one type of unit from among $R^{45}HSiO_{2/2}$ units ($R^{45}$ being as defined above; the same applies below), $HSiO_{3/2}$ units and $R^{45}_2HSiO_{1/2}$ units, and in some cases additionally having at least one type of unit from among $R^{45}_2SiO_{2/2}$ units, $R^{45}SiO_{3/2}$ units and $R^{45}_3SiO_{1/2}$ units. The sum of $R^{45}HSiO_{2/2}$ units or $R^{45}_2HSiO_{1/2}$ units is preferably at least 2, and more preferably from 10 to 100, per molecule.

The content of SiH groups in the organopolysiloxane is preferably from 0.1 to 2 mol/100 g, and especially from 0.2 to 1.5 mol/100 g.

This may be either linear or cyclic.

The content of component (c), from the standpoint of obtaining a suitable crosslink density, is from 0.1 to 50 parts by weight, preferably from 0.3 to 40 parts by weight, and more preferably from 0.5 to 30 parts by weight, per 100 parts by weight of component (a).

Moreover, at this time, the content of component (c) is preferably an amount such that the number of moles of silicon-bonded hydrogen atoms in this component (c) per mole of alkenyl groups in component (a), the molar ratio, is in the range of 1 to 10, and especially 1.2 to 7. At a molar ratio smaller than 1, the curability decreases, and adherence to the substrate may worsen; at a molar ratio larger than 10, the release force may become larger, making practical release characteristics difficult to obtain.

[(d) Platinum Group Metal Catalyst]

The platinum group metal catalyst serving as component (d) is a catalyst for promoting addition reactions between component (a) and component (c). Any catalyst known by persons skilled in the art to be one that promotes so-called hydrosilylation reactions may be used. Such platinum group metal catalysts are exemplified by platinum catalysts, palladium catalysts and rhodium catalysts. Of these, platinum catalysts are especially preferred on account of their high reactivity. Illustrative examples of platinum catalysts include platinum black, chloroplatinic acid, alcohol solutions of chloroplatinic acid, olefin complexes of platinum, alkenylsiloxane complexes of platinum, and carbonyl complexes of platinum.

The content of component (d) should be an "effective amount" as a catalyst. Specifically, in order to obtain a good cured coating and also from an economic perspective, the content, based on the weight of platinum group metal with respect to component (a), is preferably in the range of 10 to 1,000 ppm, and especially from 20 to 500 ppm.

[(e) Solvent or Water for Dilution]

A solvent or water for dilution may be included as an optional ingredient in the organopolysiloxane composition of the invention.

The organopolysiloxane composition of the invention can be prepared as a solventless composition by blending specific amounts of above components (a) to (d). However, where necessary, preparation as an emulsion-type composition diluted with water, or as a solvent-based composition diluted with a solvent is also possible. Dilution with a solvent or water provides such practical advantages as improving the coating workability and improving the state of the applied film, including the thickness of the film and the finished state at the surface.

Examples of solvents that may be used include toluene, xylene, hexane, heptane, methyl ethyl ketone, methyl isobutyl ketone, acetone and mineral oils.

When component (e) is included, the content thereof per 100 parts by weight of component (a) is preferably from 100 to 20,000 parts by weight and especially from 200 to 10,000 parts by weight. At less than 100 parts by weight, the advantages of dilution may not be obtained; at more than 20,000 parts by weight, further improvements in the advantageous effects are unlikely.

[Other Optional Ingredients]

Other ingredients may be optionally added to the organopolysiloxane composition of the invention within a range that does not detract from the objects and advantageous effects of the invention. Ingredients that are known to be commonly used in silicone-based release agent compositions may be added in conventional amounts.

Compounds known to be regulators, such as various organic nitrogen compounds, organosilicon compounds, acetylene compounds, oxime compounds and organochlorine compounds, may be used as other optionally added ingredients for such purposes as to suppress the catalytic activity of the platinum group metal catalyst. Illustrative examples include acetylene alcohols such as 3-methyl-1-butyn-3-ol, 3,5-dimethyl-1-hexyn-3-ol, 3-methyl-1-penten-3-ol and phenylbutynol; acetylene compounds such as 3-methyl-3-1-penten-1-yne and 3,5-dimethyl-1-hexyn-3-yne; reaction products of these acetylene compounds with an alkoxysilane or siloxane or with a hydrogensilane; vinyl siloxanes such as cyclic tetramethylvinylsiloxane; organic nitrogen compounds such as benzotriazole; and also organophosphorus compounds, oxime compounds and organochlorine compounds.

The content of these compounds as regulators should be an amount at which good treatment bath stability is obtained. From 0.01 to 10 parts by weight, and preferably from 0.05 to 5 parts by weight, per 100 parts by weight of component (a) is generally used.

A surfactant or a high-molecular-weight emulsifier may be included to form an emulsion-type composition. A suitable content is in the range of 0.1 to 10 parts by weight per 100 parts by weight of component (a).

In addition, known antioxidants, pigments, stabilizers, antistatic agents, defoamers, adhesion enhancers such as 3-glycidoxypropyltrimethoxysilane, and inorganic fillers such as silica may be included where necessary as optional ingredients within ranges that do not detract from the advantageous effects of the invention.

The inventive acrylic-silicone graft copolymer-containing tight release additive for release sheets may be included and used in compositions other than the above-described addition curable organopolysiloxane composition, insofar as the advantageous effects of the invention can be obtained. Examples include condensation curable silicone compositions which include a hydroxyl group-containing organopolysiloxane, an alkoxy group-containing organopolysiloxane and a condensation catalyst; radical UV curable compositions which include an organopolysiloxane containing radical polymerizable groups such as acryloyloxy groups and a photopolymerization initiator; and cationic UV curable compositions which include an epoxy group-containing organopolysiloxane and a photoacid generating catalyst such as an onium salt.

[Method of Preparing Organopolysiloxane Composition]

It is possible to actually prepare an organopolysiloxane composition for release sheets that includes the tight release additive of the invention by mixing together the above required ingredients and thoroughly stirring until a uniform solution or dispersion is obtained. Taking into account the influence on workability and performance, preferred methods include a method that involves mixing together and thoroughly stirring components (a), (b) and (c) to form a uniform solution or dispersion, and subsequently, just prior to use, adding component (d) and thoroughly stirring to effect uniform dissolution; and a method that involves mixing together and thoroughly stirring components (a), (b) and (d) to form a uniform solution or dispersion, and subsequently, just prior to use, adding component (c) and thoroughly stirring to effect uniform dissolution.

When preparing a solvent-based composition, it is preferable to mix components (a) and (b) together with an organic solvent such as toluene as component (e) and thoroughly mix so as to form a uniform solution, subsequently add and mix in component (c), and then, just prior to use, add component (d) and thoroughly stir to effect uniform dissolution.

When preparing an emulsion-type composition, it is preferable to mix components (a), (b) and (c) together with an emulsifier such as a surfactant and thoroughly stir so as form a uniform solution or dispersion, subsequently add water as component (e) and carry out dispersion with an apparatus such as a homogenizing mixer or homogenizing disperser so as to form an emulsion, and then, just prior to use, add component (d) and thoroughly stir to effect uniform dissolution.

[Coated Article]

A cured coating can be formed on a substrate by using a coating method such as roll coating, reverse coating or gravure coating to coat the above-described organopolysiloxane composition for a release sheet, either as is or after dilution with the solvent or water for dilution described above, onto one or both sides of a sheet-like substrate such as paper or film to a coating weight of from 0.01, to 100 g/m² and then heating at 50 to 200° C. for 1 to 120 seconds.

In this invention. "release sheet" includes not only products in which the sheet-like substrate is paper, but also products in which the sheet-like substrate is formed of various known types of film.

Illustrative examples of substrates include polyethylene laminated paper, glassine paper, woodfree paper, kraft paper, various types of coated papers such as clay-coated paper, synthetic papers such as Yupo, polyethylene films, polypropylene films such as CPP and OPP, polyester films such as polyethylene terephthalate film, polyamide films, polylactic acid films, polyphenol films and polycarbonate films.

[Performance]

The cured coating on the release sheet of the invention produced by the above method has release properties which, compared with when the tight release additive of component (b) is not included, exhibit a tight release force. Regarding the degree of the release properties, a tighter release force is exhibited as the amount of component (b) included increases. The release sheet thus produced undergoes substantially no change over time in the release properties and also has a good resistance to atmospheric exposure. Owing to these qualities, it is possible to adjust the release force to a desired level by changing the amount of component (b) included. Because the release properties following such adjustment also are stable, component (b) can be used as a tight release control agent having an excellent release force adjusting action. Moreover, given the distinctive feature that, compared with conventional tight release control agents, the addition of a small amount of component (b) provides a larger release-tightening effect, in addition to being advantageous in terms of cost, the advantageous effects are exhibited particularly in applications that require a tight release force. For example, release sheets having an excellent performance as casting papers and release films for production processes can be provided.

In this invention, when 0.2 g/m² of the above organopolysiloxane composition is coated onto a 38 μm PET film substrate and heated at 120° C. for 30 seconds to produce a release sheet having a silicone coating and, in accordance with the FINAT method, TESA 7475 tape is laminated onto the silicone coating surface of this release sheet under a load of 20 g/cm² (1,961 Pa) and heated at 70° C. for 20 hours and the release force of this TESA 7475 tape is measured at a peel rate of 0.3 m/min, the release force exhibited is preferably at least 1 N/10 mm, more preferably at least 2 N/10 mm, and even more preferably at least 3 N/10 mm.

When the release force is measured in the same way as above, but using Nitto 30B tape instead of TESA 7475 tape, the release force exhibited is preferably at least 0.15 N/10 mm, more preferably at least 0.2 N/10 mm, and even more preferably at least 0.3 N/10 mm.

In order to exhibit the above release force, it is desirable for the tight release additive serving as component (b) to be included in the above organopolysiloxane composition in an amount suitable for obtaining the target release force. Because the release force obtained varies with, for example, the type of pressure-sensitive adhesive, the coating conditions and the curing conditions, the amount of the tight release additive used should be set while fully taking into consideration these effects.

EXAMPLES

Synthesis Examples, Examples and Comparative Examples are given below to more concretely illustrate the invention, although the invention is not limited by these Examples. In the following Examples, the weight-average molecular weights (Mw) are measured values obtained by gel permeation chromatography (GPC) against a polystyrene standard, and the viscosities are measured values at 25° C. obtained with a rotational viscometer.

Synthesis of Tight Release Additive

Synthesis Example 1

A glass reactor equipped with a stirrer, a thermometer, a reflux condenser and a dropping device was charged with 50 parts by weight of toluene, 80.0 parts by weight of the radical polymerizable silicone macromonomer of formula (20) below (0.19 mol; Mw, 422) and 0.7 part by weight of dimethyl-2,2'-azobis(2-methylpropionate) (0.003 mol; Mw, 230.26) and heated to 70 to 80° C., after which a mixture of 5.0 parts by weight of methyl methacrylate (0.05 mol; Mw, 100.12; abbreviated below as MMA), 5.0 parts by weight of allyl methacrylate (0.04 mol; Mw, 126.15; abbreviated below as AMA), 10.0 parts by weight of glycidyl methacrylate (0.07 mol; Mw, 142.15; abbreviated below as GMA) and 50.0 parts by weight of toluene was added dropwise over 4 hours under a stream of nitrogen. Following 2 hours of polymerization at 70 to 80° C., 0.1 part by weight (0.0004 mol) of dimethyl-2,2'-azobis(2-methylpropionate) was added and 2 hours of polymerization was carried out, giving a silicone/acrylic graft copolymer. The polystyrene-equivalent weight-average molecular weight measured by GPC was 70,000.

[Chemical Formula 52]

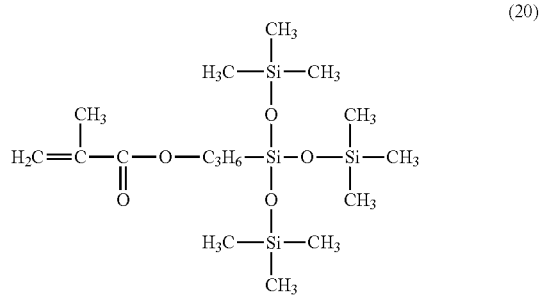

Synthesis Example 2

A glass reactor equipped with a stirrer, a thermometer, a reflux condenser and a dropping device was charged with 50.0 parts by weight of toluene, 91.8 parts by weight (0.22 mol) of the radical polymerizable silicone macromonomer of formula (20) above and 1 part by weight of benzoyl peroxide (0.004 mol; Mw, 242.23) and heated to 70 to 80° C., after which a mixture of 3.2 parts by weight (0.025 mol) of AMA, 5.0 parts by weight (0.035 mol) GMA and 50.0 parts by weight of toluene was added dropwise over 4 hours under a stream of nitrogen. Polymerization was carried out at 70 to 80'C for 2 hours, thereby giving a silicone/acrylic graft copolymer. The polystyrene-equivalent weight-average molecular weight measured by GPC was 30,000.

Synthesis Example 3

A glass reactor equipped with a stirrer, a thermometer, a reflux condenser and a dropping device was charged with 50.0 parts by weight of toluene, 42.2 parts by weight (0.1 mol) of the radical polymerizable silicone macromonomer of formula (20) above and 0.2 part by weight of tert-butylperoxy-2-ethylhexanoate (0.001 mol; Mw, 216.32) and heated to 60 to 70° C., after which a mixture of 20.0 parts by weight (0.28 mol) of MMA, 17.8 parts by weight (0.14 mol) of AMA, 20.0 parts by weight (0.14 mol) of GMA and 50.0 parts by weight of toluene was added dropwise over 4 hours under a stream of nitrogen. Following 2 hours of polymerization at 60 to 70° C. 0.1 part by weight (0.0004 mol) of tert-butylperoxy-2-ethylhexanoate was added and polymerization was carried out for 2 hours, giving a silicone/acrylic graft copolymer. The polystyrene-equivalent weight-average molecular weight measured by GPC was 100,000.

Synthesis Example 4

A glass reactor equipped with a stirrer, a thermometer, a reflux condenser and a dropping device was charged with 50.0 parts by weight of toluene, 79.4 parts by weight of the radical polymerizable silicone macromonomer of formula (21) below (0.16 mol; Mw, 496.4) and 0.7 part by weight (0.003 mol) of tert-butylperoxy-2-ethylhexanoate and heated to 70 to 80° C., after which a mixture of 5.6 parts by weight (0.06 mol) of MMA, 5.0 parts by weight (0.04 mol) of AMA, 10.0 parts by weight (0.07 mol) of GMA and 50.0 parts by weight of toluene was added dropwise over 4 hours under a stream of nitrogen. Following 2 hours of polymerization at 70 to 80° C., 0.1 part by weight (0.0006 mol) of tert-butylperoxy-2-ethylhexanoate was added and polymerization was carried out for 2 hours, giving a silicone/acrylic graft copolymer. The polystyrene-equivalent weight-average molecular weight measured by GPC was 60,000.

[Chemical Formula 53]

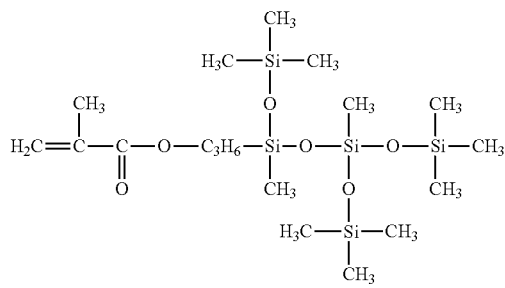

(21)

Synthesis Example 5

A glass reactor equipped with a stirrer, a thermometer, a reflux condenser and a dropping device was charged with 50.0 parts by weight of toluene, 75.0 parts by weight of the radical polymerizable silicone macromonomer of formula (22) below (0.12 mol; Mw, 630.4) and 0.5 part by weight (0.002 mol) of dimethyl-2,2'-azobis(2-methylpropionate) and heated to 60 to 70° C., after which a mixture of 5.0 parts by weight (0.05 mol) of MMA, 10.0 parts by weight (0.04 mol) of AMA, 10.0 parts by weight (0.07 mol) of GMA and 50.0 parts by weight of toluene was added dropwise over 6 hours under a stream of nitrogen. Following 2 hours of polymerization at 60 to 80° C., 0.1 part by weight (0.0006 mol) of dimethyl-2,2'-azobis(2-methylpropionate) was added and polymerization was carried out for 3 hours, giving a silicone/acrylic graft copolymer. The polystyrene-equivalent weight-average molecular weight measured by GPC was 1,000,000.

[Chemical Formula 54]

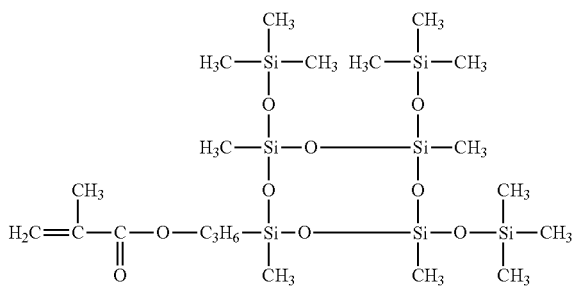

(22)

Synthesis Example 6

A glass reactor equipped with a stirrer, a thermometer, a reflux condenser and a dropping device was charged with 50.0 parts by weight of toluene, 75.0 parts by weight of the radical polymerizable silicone macromonomer of formula (23) below (0.12 mol; Mw, 648.4) and 0.4 part by weight (0.002 mol) of dimethyl-2,2'-azobis(2-methylpropionate) and heated to 60 to 70° C., after which a mixture of 5.0 parts by weight (0.05 mol) of MMA, 10.0 parts by weight (0.04 mol) of AMA, 10.0 parts by weight (0.07 mol) of GMA and 50.0 parts by weight of toluene was added dropwise over 6 hours under a stream of nitrogen. Following 2 hours of polymerization at 60 to 80° C. 0.1 part by weight (0.0006 mol) of dimethyl-2,2'-azobis(2-methylpropionate) was added and polymerization was carried out for 3 hours, giving a silicone/acrylic graft copolymer. The polystyrene-equivalent weight-average molecular weight measured by GPC was 1,700,000.

[Chemical Formula 55]

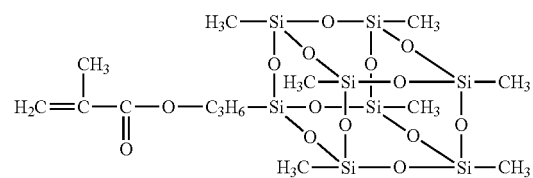

(23)

Synthesis Example 7

A glass reactor equipped with a stirrer, a thermometer, a reflux condenser and a dropping device was charged with 50.0 parts by weight of toluene, 75.0 parts by weight of the radical polymerizable silicone macromonomer of formula (24) below (0.13 mol; Mw, 570.4), 5.0 parts by weight of the radical polymerizable silicone macromonomer of formula (25) below (0.005 mol; Mw, 978.8) and 0.6 part by weight (0.003 mol) of tert-butylperoxy-2-ethylhexanoate and heated to 70 to 80° C., after which a mixture of 10.0 parts by weight (0.1 mol) of MMA, 3.0 parts by weight (0.024 mol) of AMA, 2.0 parts by weight (0.014 mol) of GMA, 5.0 parts by weight of 3,4-epoxycyclohexylmethyl methacrylate (0.025 mole; Mw, 196.2; abbreviated below as ECMA) and 50.0 parts by weight of toluene was added dropwise over 4 hours under a stream of nitrogen. Following 2 hours of polymerization at 70 to 80° C., 0.1 part by weight (0.0006 mol) of tert-butylperoxy-2-ethylhexanoate was added and polymerization was carried out for 2 hours, giving a silicone/acrylic graft copolymer. The polystyrene-equivalent weight-average molecular weight measured by GPC was 60,000.

[Chemical Formula 56]

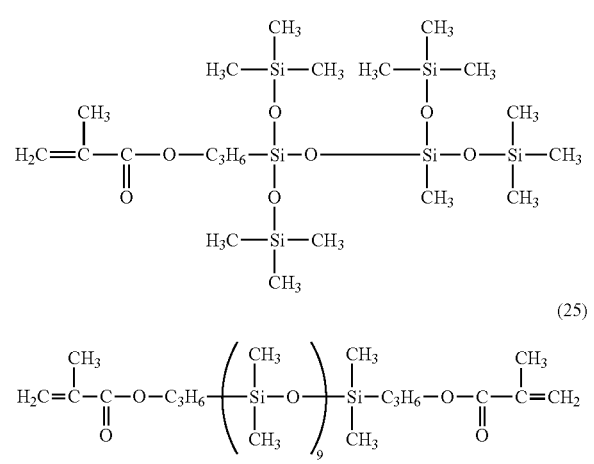

Synthesis Example 8

A glass reactor equipped with a stirrer, a thermometer, a reflux condenser and a dropping device was charged with 50.0 parts by weight of toluene, 70.0 parts by weight of the radical polymerizable silicone macromonomer of formula (20) above (0.16 mol; Mw, 422), 5.0 parts by weight of the radical polymerizable silicone macromonomer of formula (26) below (0.005 mol; Mw, 682.0) and part by weight (0.002 mol) of dimethyl-2,2'-azobis(2-methylpropionate) and heated to 70 to 80° C. after which a mixture of 7.5 parts by weight (0.075 mol) of MMA, 7.5 parts by weight (0.06 mol) of AMA, 5.0 parts by weight (0.035 mol) of GMA, 5.0 parts by weight of 3-methacryloxypropyl trimethoxysilane (0.02 mol; Mw, 248.4; abbreviated below as MSPMA) and 50.0 parts by weight of toluene was added dropwise over 6 hours under a stream of nitrogen. Following 2 hours of polymerization at 70 to 80° C. 0.1 part by weight (0.0006 mol) of dimethyl-2,2'-azobis(2-methylpropionate) was added and polymerization was carried out for 3 hours, giving a silicone/acrylic graft copolymer. The polystyrene-equivalent weight-average molecular weight measured by GPC was 1,500,000.

[Chemical Formula 57]

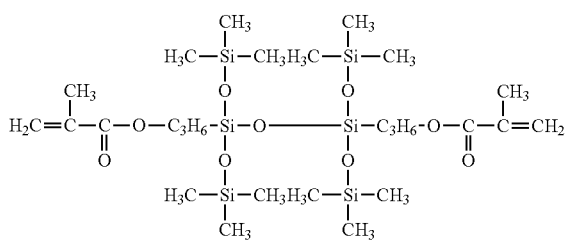

Synthesis Example 9

A glass reactor equipped with a stirrer, a thermometer, a reflux condenser and a dropping device was charged with 50.0 parts by weight of toluene, 80.0 parts by weight of the radical polymerizable silicone macromonomer or formula (27) below (0.19 mol; Mw, 421) and 0.6 part by weight (0.003 mol) of tert-butylperoxy-2-ethylhexanoate and heated to 70 to 80° C. after which a mixture of 5.0 parts by weight (0.05 mol) of MMA, 5.0 parts by weight (0.04 mol) of AMA, 10.0 parts by weight (0.07 mol) of GMA and 50.0 parts by weight of toluene was added dropwise over 4 hours under a stream of nitrogen. Following 2 hours of polymerization at 70 to 80° C., 0.1 part by weight (0.0006 mol) of tert-butylperoxy-2-ethylhexanoate was added and polymerization was carried out for 2 hours, giving a silicone/acrylic graft copolymer. The polystyrene-equivalent weight-average molecular weight measured by GPC was 70,000.

[Chemical Formula 58]

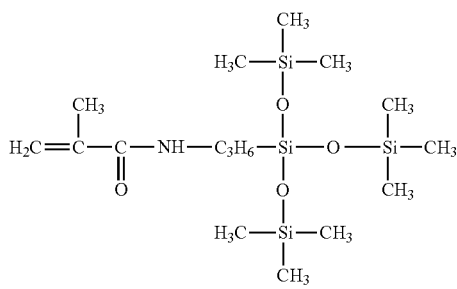

Synthesis Example 10

Aside from using 80.0 parts by weight of the radical polymerizable silicone macromonomer of formula (28) below (0.1 mol; Mw, 834.4) instead of the radical polymerizable silicone macromonomer of formula (20) above, the same procedure was carried out as in Synthesis Example 1, giving a silicone/acrylic graft copolymer. The polystyrene-equivalent weight-average molecular weight measured by GPC was 50,000.

[Chemical Formula 59]

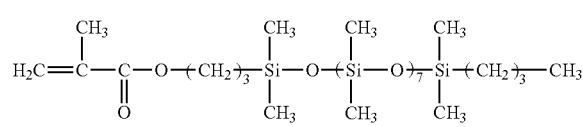

(28)

Synthesis Example 11

Aside from setting the amount of MMA in Synthesis Example 1 to 10.0 parts by weight and omitting AMA, the same procedure was carried out as in Synthesis Example 1, giving a silicone/acrylic graft copolymer. The polystyrene-equivalent weight-average molecular weight measured by GPC was 60.000.

TABLE 1

| Component (pbw) | | Synthesis Example 1 | Synthesis Example 2 | Synthesis Example 3 | Synthesis Example 4 | Synthesis Example 5 | Synthesis Example 6 |
|---|---|---|---|---|---|---|---|
| (A1) | Formula (20) | 80.0 | 91.8 | 42.2 | | | |
| | Formula (21) | | | | 79.4 | | |
| | Formula (22) | | | | | 75.0 | |
| | Formula (23) | | | | | | 75.0 |
| | Formula (24) | | | | | | |
| | Formula (27) | | | | | | |
| | Formula (28) | | | | | | |
| (B1) | MMA | 5.0 | | 20.0 | 5.6 | 5.0 | 5.0 |
| (B2) | AMA | 5.0 | 3.2 | 17.8 | 5.0 | 10.0 | 10.0 |
| (A2) | Formula (25) | | | | | | |
| | Formula (26) | | | | | | |
| (B3) | GMA | 10.0 | 5.0 | 20.0 | 10.0 | 10.0 | 10.0 |
| | ECMA | | | | | | |
| | MSPMA | | | | | | |
| Diluting solvent | Toluene | 100.0 | 100.0 | 100.0 | 100.0 | 100.0 | 100.0 |
| Radical polymerization initiator | Azo | 0.7 + 0.1 | | | | 0.5 + 0.1 | 0.4 + 0.1 |
| | Peroxide 1 | | 1 | | | | |
| | Peroxide 2 | | | 0.2 + 0.1 | 0.7 + 0.1 | | |
| Total | (pbw) | 200.0 | 200.0 | 200.0 | 200.0 | 200.0 | 200.0 |
| Active ingredients | (%) | 50 | 50 | 50 | 50 | 50 | 50 |
| Mw | | 70,000 | 30,000 | 100,000 | 60,000 | 1,000,000 | 1,700,000 |

Radical Polymerization Initiators
Azo: Dimethyl-2,2'-azobis(2-methylpropionate)
Peroxide 1: Benzoyl peroxide
Peroxide 2: tert-Butylperoxy-2-ethylhexanoate

TABLE 2

| Component (pbw) | | Synthesis Example 7 | Synthesis Example 8 | Synthesis Example 9 | Synthesis Example 10 | Synthesis Example 11 |
|---|---|---|---|---|---|---|
| (A1) | Formula (20) | | 70.0 | | | 80.0 |
| | Formula (21) | | | | | |
| | Formula (22) | | | | | |
| | Formula (23) | | | | | |
| | Formula (24) | 75.0 | | | | |
| | Formula (27) | | | 80.0 | | |
| | Formula (28) | | | | 80.0 | |
| (B1) | MMA | 10.0 | 7.5 | 5.0 | 5.0 | 10.0 |
| (B2) | AMA | 3.0 | 7.5 | 5.0 | 5.0 | |
| (A2) | Formula (25) | 5.0 | | | | |
| | Formula (26) | | 5.0 | | | |
| (B3) | GMA | 2.0 | 5.0 | 10.0 | 10.0 | 10.0 |
| | ECMA | 5.0 | | | | |
| | MSPMA | | | 5.0 | | |
| Diluting solvent | Toluene | 100.0 | 100.0 | 100.0 | 100.0 | 100.0 |
| Radical polymerization initiator | Azo | | 0.4 + 0.1 | | 0.7 + 0.1 | 0.7 + 0.1 |
| | Peroxide 1 | | | | | |
| | Peroxide 2 | 0.6 + 0.1 | | 0.6 + 0.1 | | |
| Total | (pbw) | 200.0 | 200.0 | 200.0 | 200.0 | 200.0 |
| Active ingredients | (%) | 50 | 50 | 50 | 50 | 50 |
| Mw | | 60,000 | 1,500,000 | 70,000 | 50,000 | 60,000 |

Radical Polymerization Initiators
Azo: Dimethyl-2,2'-azobis(2-methylpropionate)
Peroxide 1: Benzoyl peroxide
Peroxide 2: tert-Butylperoxy-2-ethylhexanoate

Example 1

The following ingredients were placed in a flask and dissolved by stirring at 20 to 40° C.: as component (a), 100 parts by weight of (a-1) an organopolysiloxane (vinyl group content=0.02 mol/100 g) which has a viscosity at 25° C. as a 30 wt % toluene solution of 15 Pa·s, which is capped at both ends of the molecular chain with dimethylvinylsilyl groups represented as $(CH_3)_2(CH_2=CH)SiO_{1/2}$, and whose backbone, exclusive of the ends, is composed of 1.5 mol % of methylvinylsiloxane units represented as $(CH_3)(CH_2=CH)SiO_{2/2}$ and 98.5 mol % of dimethylsiloxane units represented as $(CH_3)_2SiO_{2/2}$; as component (b), 20 parts by weight of the silicone/acrylic graft copolymer from Synthesis Example 1 (50 wt % toluene solution) as the active ingredient; and, as component (e), 2,3218 parts by weight of toluene (e-1).

The following were added to the resulting solution and mixture was achieved by one hour of stilling at 20 to 40° C.: as component (c), 2.6 parts by weight of (c-1) a linear organohydrogenpolysiloxane (SiH content=1.5 mol/100 g) (wherein the number of moles of silicon-bonded hydrogen atoms corresponds to 2 times the number of moles of unsaturated groups included in component (a)); and, as a regulator, 1 part by weight of 3-methyl-1-butyn-3-ol.

As component (d) which is the catalyst, a platinum-vinyl siloxane complex was added to the resulting mixture in an amount corresponding to 0.07 part by weight of platinum, thereby preparing a coating composition.

Example 2

Aside from changing component (b) to the copolymer from Synthesis Example 2, the same procedure was followed as in Example 1.

Example 3

Aside from changing component (b) to the copolymer from Synthesis Example 3, the same procedure was followed as in Example 1.

Example 4

Aside from using 40 parts by weight of the copolymer from Synthesis Example 1 as component (b), 2,728 parts by weight of toluene (e-1) as component (e) and 0.08 part by weight (platinum basis) of the catalyst of component (d), the same procedure was followed as in Example 1.

Example 5

Aside from using 70 parts by weight of the copolymer from Synthesis Example 1 as component (b), 3,298 parts by weight of (e-1) as component (e) and 0.1 part by weight (platinum basis) of the catalyst of component (d), the same procedure was followed as in Example 1.

Example 6

The following ingredients were placed in a flask and dissolved by stirring at 20 to 40° C.: as component (a), 100 parts by weight of (a-2) an organopolysiloxan (vinyl group content=0.04 mol/100 g) which has a viscosity at 25° C. as a 30 wt % toluene solution of 10 Pa·s, which is capped at the ends of the molecular chain with dimethylvinylsilyl groups represented as $(CH_3)_2(CH_2=CH)SiO_{1/2}$, and whose backbone, exclusive of the ends, is composed of 3.0 mol % of methylvinylsiloxane units represented as $(CH_3)(CH_2=CH)SiO_{2/2}$, 96.9 mole % of dimethylsiloxane units represented as $(CH_3)_2SiO_{2/2}$ and 0.1 mol % of methylsiloxane units represented as $(CH_3)SiO_{3/2}$; as component (b), 15 parts by weight of the silicone/acrylic graft copolymer from Synthesis Example 4 (50 wt % toluene solution) as the active ingredient; and, as component (e), 2,301 parts by weight of toluene (e-1).

The following were added to the resulting solution and mixture was achieved by one hour of stirring at 20 to 40° C.: as component (c), 3.4 parts by weight of (c-1) a linear organohydrogenpolysiloxane (SiH content=1.5 mol/100 g) and 1.7 parts by weight of (c-2) a cyclic organohydrogenpolysiloxane (SiH content=1.7 mol/100 g) having a viscosity at 25° C. of 0.005 Pa·s (wherein the number of moles of silicon-bonded hydrogen atoms corresponds to 2.4 times the number of moles of unsaturated groups included in component (a)); and, as a regulator, 1 part by weight of 3-methyl-1-butyn-3-ol.

As component (d) which is the catalyst, a platinum-vinyl siloxane complex was added to the resulting, mixture in an amount corresponding to 0.07 part by weight of platinum, thereby preparing a coating composition.

Example 7

The following ingredients were placed in a flask and dissolved by stirring at 20 to 40° C.: as component (a), 100 pails by weight of (a-3) an organopolysiloxane (vinyl group content=0.01 mol/100 g) which has a viscosity at 25° C. as a 30 wt % toluene solution of 20 Pa·s, which is capped at both ends of the molecular chain with dimethylvinylsilyl groups represented as $(CH_3)_2(CH_2=CH)SiO_{1/2}$, and whose backbone, exclusive of the ends, is composed of 0.7 mol % of methylvinylsiloxane units represented as $(CH_3)_2(CH_2=CH)SiO_{2/2}$ and 99.3 mol % of dimethylsiloxane units represented as $(CH_3)_2SiO_{2/2}$; as component (b), 10 parts by weight of the silicone/acrylic graft copolymer from Synthesis Example 5 (50 wt % toluene solution) as the active ingredient, and, as component (e), 2,147 parts by weight of toluene (e-1).

The following were added to the resulting solution and mixture was achieved by one hour of stirring at 20 to 40° C. as component (c), 2 parts by weight of (c-1) a linear organohydrogenpolysiloxane (SiH content=1.5 mol/100 g) (wherein the number of moles of silicon-bonded hydrogen atoms corresponds to 3 times the number of moles of unsaturated groups included in component (a)); and, as a regulator. 1 part by weight of 3-methyl-1-butyn-3-ol.

As the catalyst of component (d), a platinum-vinyl siloxane complex was added to the resulting mixture in an amount corresponding to 0.06 part by weight of platinum, thereby preparing a coating composition.

Example 8

The following ingredients were placed in a flask and dissolved by stirring at 20 to 40° C.: as component (a), 100 parts by weight of (a-4) an organopolysiloxane (vinyl group content=0.04 mol/100 g) which has a viscosity at 25° C. as a 30 wt % toluene solution of 15 Pa·s, which is capped at both ends of the molecular chain with dimethylvinylsilyl groups represented as $(CH_3)_2(CH_2=CH)SiO_{1/2}$, and whose backbone, exclusive of the ends, is composed of 4 mol % methylvinylsiloxane units represented as $(CH_3)(CH_2=CH)SiO_{2/2}$, 91 mol % of dimethylsiloxane units represented as $(CH_3)_2SiO_{2/2}$ and 5 mol % of diphenylsiloxane units represented as $(C_6H_5)_2SiO_{2/2}$; as component (b), 10 parts by weight of the silicone/acrylic graft copolymer from Synthesis Example 6 (50 wt % toluene solution) as the active ingredient; and, as component (e), 3,977 parts by weight of a toluene/heptane=1/1 (weight ratio) mixed solvent (e-2).

The following were added to the resulting solution and mixture was achieved by one hour of stirring at 20 to 40° C.: as component (c), 6 parts by weight of (c-1) a linear organohydrogenpolysiloxane (SiH content=1.5 mol/100 g) and 6 parts by weight of a linear organohydrogenpolysiloxane (c-3) (SiH content=0.68 mol/100 g) which has a viscosity at 25° C. of 0.5 Pa·s, which is capped at both ends of the molecular chain with dimethylhydrogensilyl groups represented as $(CH_3)_2HSiO_{1/2}$, and whose backbone, exclusive of the ends, is composed of 60 mol % of methylhydrogensiloxane units represented as $(CH_3)HSiO_{2/2}$, 20 mol % of dimethylsiloxane units represented as $(CH_3)_2SiO_{2/2}$ and 20 mol % of diphenylsiloxane units represented as $(C_6H_5)_2SiO_{2/2}$ (wherein the number of moles of silicon-bonded hydrogen atoms corresponds to 3 times the number of moles of unsaturated groups included in component (a)); and, as a regulator, 1 part by weight of 3-methyl-1-butyn-3-ol.

As the catalyst of component (d), a platinum-vinyl siloxane complex was added to the resulting mixture in an amount corresponding to 0.09 part by weight of platinum, thereby preparing a coating composition.

Example 9

The following ingredients were placed in a flask and dissolved by stirring at 20 to 40° C.: as component (a), 100 parts by weight of (a-1) an organopolysiloxane (vinyl group content=0.02 mol/100 g); as component (b), 10 parts by weight of the silicone/acrylic graft copolymer from Synthesis Example 7 (50 wt % toluene solution) as the active ingredient; and, as component (e), 3,848 parts by weight of a toluene/heptane=1/1 (weight ratio) mixed solvent (e-2).

The following were added to the resulting solution and mixture was achieved by one hour of stirring at 20 to 40° C.: as component (c), 5.5 parts by weight of (c-1) a linear organohydrogenpolysiloxane (SiH content=1.5 mol/100 g) (wherein the number of moles of silicon-bonded hydrogen atoms corresponds to 5 times the number of moles of unsaturated groups included in component (a)); and, as regulators, 1 part by weight of 3-methyl-1-butyn-3-ol and 1.5 parts by weight of 3-glycidoxypropyltrimethoxysilane.

As the catalyst of component (d), a platinum-vinyl siloxane complex was added to the resulting mixture in an amount corresponding to 0.09 part by weight of platinum, thereby preparing a coating composition.

Example 10

The following ingredients were placed in a flask and dissolved by stirring at 20 to 40° C.: as component (a), 100 parts by weight of (a-5) an organopolysiloxane (vinyl group content=0.02 mol/100 g) which has a viscosity at 25° C. as a 30 wt % toluene solution of 10 Pa·s, which is capped at both ends of the molecular chain with dimethylvinylsilyl groups represented as $(CH_3)_2(CH_2=CH)SiO_{1/2}$, and whose backbone, exclusive of the ends, is composed of 1.5 mol % of methylvinylsiloxane units represented as $(CH_3)_2(CH_2=CH)SiO_{2/2}$, 96 mol % of dimethylsiloxane units represented as $(CH_3)_2SiO_{2/2}$ and 2.5 mol % of diphenylsiloxane units represented as $(C_6H_5)_2SiO_{2/2}$; as component (b), 10 parts by weight of the silicone/acrylic graft copolymer from Synthesis Example 8 (50 wt % toluene solution) as the active ingredient; and, as component (e), 3,815 parts by weight of a toluene/heptane=1/1 (weight ratio) mixed solvent (e-2).

The following were added to the resulting solution and mixture was achieved by one hour of stirring at 20 to 40° C.: as component (c), 4 parts by weight of (c-1) a linear organohydrogenpolysiloxane (SiH content=1.5 mol/100 g) and 3 parts by weight of (c-3) a linear organohydrogenpolysiloxane (SiH content=0.68 mol/100 g) (wherein the number of moles of silicon-bonded hydrogen atoms corresponds to 4 times the number of moles of unsaturated groups included in component (a)); and, as a regulator, 1 part by weight of 3-methyl-1-butyn-3-ol.

As the catalyst of component (d), a platinum-vinyl siloxane complex was added to the resulting mixture in an amount corresponding to 0.09 part by weight of platinum, thereby preparing a coating composition.

Example 11

The following ingredients were placed in a flask and dissolved by stirring at 20 to 40° C.: as component (a), 100 parts by weight of (a-5) an organopolysiloxane (vinyl group content=0.02 mol/100 g); as component (b), 5 parts by weight of the silicone/acrylic graft copolymer from Synthesis Example 9 (50 wt % toluene solution) as the active ingredient; and, as component (e), 3.654 parts by weight of a toluene/heptane=(weight ratio) mixed solvent (e-2).

The following were added to the resulting solution and mixture was achieved by one hour of stirring at 20 to 40° C.: as component (c), 4 parts by weight of (c-1) a linear organohydrogenpolysiloxane (SiH content=1.5 mol/100 g) and 3 parts by weight of (c-3) a linear organohydrogenpolysiloxane (SiH content=0.68 mol/100 g) (wherein the number of moles of silicon-bonded hydrogen atoms corresponds to 4 times the number of moles of unsaturated groups included in component (a)); and, as a regulator. 1 part by weight of 3-methyl-1-butyn-3-ol.

As the catalyst of component (d), a platinum-vinyl siloxane complex was added to the resulting mixture in an amount corresponding to 0.09 part by weight of platinum, thereby preparing a coating composition.

Comparative Example 1

Aside from not including component (b) and including, as component (e), 1,968 parts by weight of toluene (e-1), the same procedure was followed as in Example 1.

Comparative Example 2

Aside from not including component (b), including 20 parts by weight of an organopolysiloxane MQ resin (vinyl group content, 0.07 mol/100 g) which consists of 5 mol % of $(CH_3)_2(CH_2=CH)SiO_{1/2}$ units, 45 mol % of $(CH_3)_3SiO_{1/2}$ units and 50 mol % of $SiO_{4/2}$ units, and has an average degree of polymerization of 100, including, as component (e). 2,385 parts by weight of toluene (e-1) and including, as component (c), 4.5 parts by weight of (c-1), the same procedure was followed as in Example 1.

Comparative Example 3

Aside from not including component (b) and including, as component (e), 2,016 parts by weight of toluene (e-1), the same procedure was followed as in Example 6.

Comparative Example 4

Aside from not including component (b) and including, as component (e), 1,957 parts by weight of toluene (e-1), the same procedure was followed as in Example 7.

Comparative Example 5

Aside from not including component (b) and including, as component (e) 3,654 parts by weight of a toluene/hexane mixed solvent (e-2), the same procedure was followed as in Example 8.

Comparative Example 6

Aside from not including component (b) and including, as component (e), 3,524 parts by weight of a toluene/hexane mixed solvent (e-2), the same procedure was followed as in Example 9.

Comparative Example 7

Aside from not including component (b) and including, as component (e), 3,492 parts by weight of a toluene/hexane mixed solvent (e-2), the same procedure was followed as in Example 10.

Comparative Example 8

Aside from including, as component (b), 20 parts by weight of the silicone/acrylic graft copolymer (50 wt % toluene solution) from Synthesis Example 11 as the active ingredient, the same procedure was followed as in Example 1.

Example 12

Aside from including, as component (b), 20 parts by weight of the silicone/acrylic graft copolymer (50 wt % toluene solution) from Synthesis Example 10 as the active ingredient, the same procedure was followed as in Example 1.

<Evaluation>

[Appearance of Coating Composition]

The appearance of the coating compositions prepared in the Examples and Comparative Examples was visually examined.

[Curability]

Release sheets, were produced by applying the coating compositions prepared in the Examples and Comparative Examples onto 100 µm thick PE laminated paper using a #15 bar coater in Examples 1 to 7 and 12 and Comparative Examples 1 to 4 and 8, and onto 40 µm thick PET film using a #10 bar coater in Examples 8 to 11 and Comparative Examples 5 to 7, then heating for 1 minute in a 100° C. hot-air dryer. The release agent layer on the resulting release sheet was rubbed ten times by finger, after which it was visually examined for the presence/absence of haze or shedding, and rated according to the following criteria.

A: No haze or shedding was observed.
B: Haze or shedding was observed.

[Adherence]

Release sheets were produced by applying the coating compositions prepared in the Examples and Comparative Examples onto 100 µm thick PE laminated paper using a #15 bar coater in Examples 1 to 7 and 12 and Comparative Examples 1 to 4 and 8, and onto 40 µm thick PET film using a #10 bar coiner in Examples 8 to 11 and Comparative Examples 5 to 7, then heating for 1 minute in a 120° C. hot-air dryer. The release sheets were held for one week at 25° C. and 50% RH and the release agent layer was rubbed ten times by finger, after which it was visually examined for the presence/absence of haze or shedding and rated according to the following criteria.

A: No haze or shedding was observed even after one week.
B: Haze or shedding was observed.

[Coating Appearance]

The release sheet obtained in the above adherence test was visually examined.

A: Release agent layer was clear and free of haze B: Release agent layer exhibited haze

[Release Force A]

A release sheet was produced in the same way as in the adherence test above, and Tesa 7475 (a trade name of Tesa Tape, Inc.) acrylic pressure-sensitive adhesive tape having to a width of 25 mm was placed on the release agent layer, face of the release sheet. Next, a load of 1,961 Pa was placed on this pressure-sensitive adhesive tape and 20 hours of heat treatment at 70° C. was carried out, thereby laminating the acrylic pressure-sensitive adhesive tape to the release agent layer. Using a tensile testing machine, the acrylic pressure-sensitive adhesive tape was peeled from the release agent layer at an angle of 180° (peel rate, 0.3 m/min) and the release force was measured.

[Release Force B: Release Force after Aging]

A release sheet was produced in the same way as in the adherence test above, and was held at 25° C. and 50% RE for two weeks. The release force of the release sheet after such aging was measured in the same way as Release Force A above.

[Release Force C]

A release sheet was produced in the same way as in the adherence test above, and No. 31B (Nitto 31B tape, a trade name of Nitto Denko Corporation) polyester pressure-sensitive adhesive tape having a width of 25 mm was placed on the release agent layer face of the release sheet. Next, a load of 1.961 Pa was placed on this pressure-sensitive adhesive tape and 20 hours of heat treatment at 70° C. was carried out, thereby laminating the polyester pressure-sensitive adhesive tape to the release agent layer. Using a tensile testing machine, the polyester pressure-sensitive adhesive tape was peeled from the release agent layer at an angle of 180° (peel rate, 0.3 m/min) and the release force was measured.

[Subsequent Adhesion Ratio]

Aside from using No. 31B (Nitto 31B tape, a trade name of Ditto Denko Corporation) polyester pressure-sensitive release tape instead of Tesa 7475 acrylic pressure-sensitive adhesive tape, the polyester pressure-sensitive adhesive tape was laminated onto the release agent layer surface in the same way as in the measurement of release force described above. The polyester pressure-sensitive adhesive tape was then peeled from the release agent layer and attached to a stainless steel plate. Next, using a tensile testing machine, the polyester pressure-sensitive adhesive tape was peeled from the stainless steel plate and the release force X was measured.

In addition, a polyester pressure-sensitive adhesive tape was laminated onto a polytetrafluoroethylene plate instead of the above release agent layer and was similarly treated, following which the release force Y was measured.

The subsequent adhesion ratio was then calculated from the following formula.

(release force $X$/release force $Y$)×100

The higher the subsequent adhesion ratio, the better the release properties of the release agent layer, indicating that reduction in the release force of the polyester pressure-sensitive adhesive tape on account of lamination to the release agent layer is suppressed.

Tables 3 to 5 show the ingredients that make up the respective coating compositions in Examples 1 to 11 and Comparative Examples 1 to 8, and the results of evaluations in these Examples.

TABLE 3

| | | Example | | | | | | |
|---|---|---|---|---|---|---|---|---|
| Ingredients (pbw) | | 1 | 2 | 3 | 4 | 5 | 6 | 7 |
| (a) | (a-1) | 100 | 100 | 100 | 100 | 100 | | |
| | (a-2) | | | | | | 100 | |
| | (a-3) | | | | | | | 100 |
| | (a-4) | | | | | | | |
| | (a-5) | | | | | | | |
| (c) | (c-1) | 2.6 | 2.6 | 2.6 | 2.6 | 2.6 | 3.4 | 2 |
| | (c-2) | | | | | | 1.7 | |
| | (c-3) | | | | | | | |
| (e) | (e-1) | 2,348 | 2,348 | 2,348 | 2,728 | 3,298 | 2,301 | 2,147 |
| | (e-2) | | | | | | | |
| (b) (active ingredient) | Synthesis Example 1 | 20 | | | 40 | 70 | | |
| | Synthesis Example 2 | | 20 | | | | | |
| | Synthesis Example 3 | | | 20 | | | | |
| | Synthesis Example 4 | | | | | | 15 | |
| | Synthesis Example 5 | | | | | | | 10 |
| | Synthesis Example 6 | | | | | | | |
| | Synthesis Example 7 | | | | | | | |
| | Synthesis Example 8 | | | | | | | |
| | Synthesis Example 9 | | | | | | | |
| | Synthesis Example 10 | | | | | | | |
| | Synthesis Example 11 | | | | | | | |
| Additive | Epoxy | | | | | | | |
| | MQ resin | | | | | | | |
| Regulator | | 1 | 1 | 1 | 1 | 1 | 1 | 1 |
| (d) | Pt basis | 0.07 | 0.07 | 0.07 | 0.08 | 0.1 | 0.07 | 0.06 |
| Total | | 2,472 | 2,472 | 2,472 | 2,872 | 3,472 | 2,422 | 2,260 |
| H/Vi | | 2 | 2 | 2 | 2 | 2 | 2.4 | 3 |
| Evaluation Results | | | | | | | | |
| Composition appearance | | good | good | good | good | good | good | good |
| Curability | | A | A | A | A | A | A | A |
| Subsequent adhesion ratio (%) | | 98 | 100 | 98 | 97 | 95 | 100 | 100 |
| Release force A (N/10 mm) | | 6.74 | 6.27 | 7.51 | 10.11 | 15.50 | 7.88 | 4.52 |
| Release force B (N/10 mm) | | 6.08 | 5.87 | 7.01 | 8.95 | 13.73 | 6.52 | 4.22 |
| Release force C (N/10 mm) | | 1.17 | 1.30 | 1.19 | 2.14 | 2.48 | 1.39 | 0.76 |
| Coating appearance | | A | A | A | A | A | A | A |
| Adherence | | A | A | A | A | A | A | A |

Additives
Epoxy: 3-glycidoxypropyltrimethoxsilane

TABLE 4

| | | Example | | | | Comparative Example | |
|---|---|---|---|---|---|---|---|
| Ingredients (pbw) | | 8 | 9 | 10 | 11 | 1 | 2 |
| (a) | (a-1) | | 100 | | | 100 | 100 |
| | (a-2) | | | | | | |
| | (a-3) | | | | | | |
| | (a-4) | 100 | | | | | |
| | (a-5) | | | 100 | 100 | | |
| (c) | (c-1) | 6 | 6.5 | 4 | 4 | 2.6 | 4.5 |
| | (c-2) | | | | | | |
| | (c-3) | 6 | | 3 | 3 | | |
| (e) | (e-1) | | | | | 1,968 | 2,385 |
| | (e-2) | 3,977 | 3,848 | 3,815 | 3,654 | | |
| (b) (active ingredient) | Synthesis Example 1 | | | | | | |
| | Synthesis Example 2 | | | | | | |
| | Synthesis Example 3 | | | | | | |
| | Synthesis Example 4 | | | | | | |
| | Synthesis Example 5 | | | | | | |
| | Synthesis Example 6 | 10 | | | | | |
| | Synthesis Example 7 | | 10 | | | | |

TABLE 4-continued

|  | Ingredients (pbw) | Example 8 | Example 9 | Example 10 | Example 11 | Comparative Example 1 | Comparative Example 2 |
|---|---|---|---|---|---|---|---|
|  | Synthesis Example 8 |  |  | 10 |  |  |  |
|  | Synthesis Example 9 |  |  |  | 5 |  |  |
|  | Synthesis Example 10 |  |  |  |  |  |  |
|  | Synthesis Example 11 |  |  |  |  |  |  |
| Additive | Epoxy |  | 1.5 |  |  |  |  |
|  | MQ resin |  |  |  |  |  | 20 |
| Regulator |  | 1 | 1 | 1 | 1 | 1 | 1 |
| (d) | Pt basis | 0.09 | 0.09 | 0.09 | 0.09 | 0.07 | 0.07 |
| Total |  | 4,100 | 3,967 | 3,933 | 3,767 | 2,072 | 2,511 |
| H/Vi |  | 3 | 5 | 4 | 4 | 2 | 2 |
|  |  | Evaluation Results |  |  |  |  |  |
| Composition appearance |  | good | good | good | good | good | good |
| Curability |  | A | A | A | A | A | A |
| Subsequent adhesion ratio (%) |  | 98 | 100 | 98 | 99 | 100 | 98 |
| Release force A (N/10 mm) |  | 7.24 | 5.58 | 6.19 | 4.38 | 0.43 | 1.87 |
| Release force B (N/10 mm) |  | 5.26 | 4.61 | 4.88 | 3.29 | 0.25 | 0.77 |
| Release force C (N/10 mm) |  | 1.22 | 0.91 | 1.08 | 0.81 | 0.04 | 0.20 |
| Coating appearance |  | A | A | A | A | A | A |
| Adherence |  | A | A | A | A | A | A |

Additives
Epoxy: 3-glycidoxypropyltrimethoxsilane

TABLE 5

|  | Ingredients (pbw) | Comparative Example 3 | Comparative Example 4 | Comparative Example 5 | Comparative Example 6 | Comparative Example 7 | Comparative Example 8 |
|---|---|---|---|---|---|---|---|
| (a) | (a-1) |  |  |  | 100 |  | 100 |
|  | (a-2) | 100 |  |  |  |  |  |
|  | (a-3) |  | 100 |  |  |  |  |
|  | (a-4) |  |  | 100 |  |  |  |
|  | (a-5) |  |  |  |  | 100 |  |
| (c) | (c-1) | 3.4 | 2 | 6 | 6.5 | 4 | 2.6 |
|  | (c-2) | 1.7 |  |  |  |  |  |
|  | (c-3) |  |  | 6 |  | 3 |  |
| (e) | (e-1) | 2,016 | 1,957 |  |  |  | 2,348 |
|  | (e-2) |  |  | 3,654 | 3,524 | 3,492 |  |
| (b) (active ingredient) | Synthesis Example 1 |  |  |  |  |  |  |
|  | Synthesis Example 2 |  |  |  |  |  |  |
|  | Synthesis Example 3 |  |  |  |  |  |  |
|  | Synthesis Example 4 |  |  |  |  |  |  |
|  | Synthesis Example 5 |  |  |  |  |  |  |
|  | Synthesis Example 6 |  |  |  |  |  |  |
|  | Synthesis Example 7 |  |  |  |  |  |  |
|  | Synthesis Example 8 |  |  |  |  |  |  |
|  | Synthesis Example 9 |  |  |  |  |  |  |
|  | Synthesis Example 10 |  |  |  |  |  |  |
|  | Synthesis Example 11 |  |  |  |  |  | 20 |
| Additive | Epoxy |  |  |  | 1.5 |  |  |
|  | MQ resin |  |  |  |  |  |  |
| Regulator |  | 1 | 1 | 1 | 1 | 1 | 1 |
| (d) | Pt basis | 0.07 | 0.06 | 0.09 | 0.09 | 0.09 | 0.07 |
| Total |  | 2,122 | 2,060 | 3,767 | 3,633 | 3,600 | 2,472 |
| H/Vi |  | 2.4 | 3 | 3 | 5 | 4 | 2 |
|  |  | Evaluation Results |  |  |  |  |  |
| Composition appearance |  | good | good | good | good | good | good |
| Curability |  | A | A | A | A | A | A |
| Subsequent adhesion ratio (%) |  | 100 | 100 | 98 | 100 | 98 | 99 |
| Release force A (N/10 mm) |  | 1.85 | 0.35 | 0.75 | 0.34 | 0.52 | 0.51 |
| Release force B (N/10 mm) |  | 1.12 | 0.16 | 0.41 | 0.17 | 0.30 | 0.39 |
| Release force C (N/10 mm) |  | 0.25 | 0.03 | 0.07 | 0.03 | 0.05 | 0.06 |
| Coating appearance |  | A | A | A | A | A | A |
| Adherence |  | A | A | A | A | A | A |

Additives
Epoxy: 3-glycidoxypropyltrimethoxsilane

TABLE 6

| Ingredients (pbw) | | Example 12 |
|---|---|---|
| (a) | (a-1) | 100 |
|  | (a-2) |  |
|  | (a-3) |  |
|  | (a-4) |  |
|  | (a-5) |  |
| (c) | (c-1) | 2.6 |
|  | (c-2) |  |
|  | (c-3) |  |
| (e) | (e-1) | 2,348 |
|  | (e-2) |  |
| (b) (active ingredient) | Synthesis Example 1 |  |
|  | Synthesis Example 2 |  |
|  | Synthesis Example 3 |  |
|  | Synthesis Example 4 |  |
|  | Synthesis Example 5 |  |
|  | Synthesis Example 6 |  |
|  | Synthesis Example 7 |  |
|  | Synthesis Example 8 |  |
|  | Synthesis Example 9 |  |
|  | Synthesis Example 10 | 20 |
|  | Synthesis Example 11 |  |
| Additive | Epoxy |  |
|  | MQ resin |  |
|  | Regulator | 1 |
| (d) | Pt basis | 0.07 |
|  | Total | 2,472 |
|  | H/Vi | 2 |
| Evaluation Results |  |  |
| Composition appearance |  | good |
| Curability |  | A |
| Subsequent adhesion ratio (%) |  | 99 |
| Release force A (N/10 mm) |  | 1.38 |
| Release force B (N/10 mm) |  | 1.79 |
| Release force C (N/10 mm) |  | 0.18 |
| Coating appearance |  | A |
| Adherence |  | A |

Additives
Epoxy: 3-glycidoxypropyltrimethoxsilane

The invention claimed is:

1. A tight release additive for a release sheet, comprising an acrylic-silicone graft copolymer which has a weight-average molecular weight of from 30,000 to 2,000,000 and is obtained by radical polymerizing:

(A) an organopolysiloxane compound having a radical polymerizable group, and (B) a radical polymerizable monomer having an acrylic group and/or a methacrylic group, wherein component (A) includes (A1) an organopolysiloxane compound having one radical polymerizable group per molecule, (A1) being a radical polymerizable silicone macromonomer of formula (1)

[Chemical Formula 1]

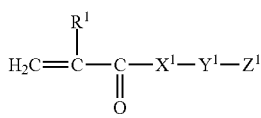

(1)

wherein $R^1$ is a hydrogen atom or a methyl group, $X^1$ is an oxygen atom, an NH group, or a sulfur atom, $Y^1$ is a divalent hydrocarbon group of 1 to 12 carbon atoms which may have an intervening oxygen atom, and $Z^1$ is a monovalent silicone residue having a branched, cyclic, or cage-like structure that includes at least one siloxane unit of formula (2) or of formula (3) below

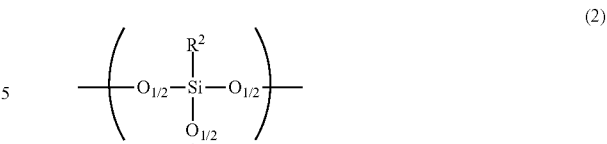

(2)

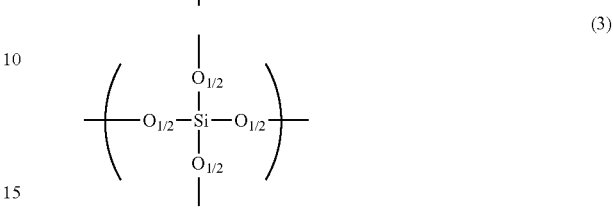

(3)

wherein $R^2$ is a monovalent hydrocarbon group of 1 to 20 carbon atoms, and $—O_{1/2}—$ indicates bridging to another element through an oxygen atom, with the proviso that when siloxane unit (2) or (3) is adjacent to $Y^1$, it is a siloxane unit of, respectively, general formula (2') or (3') below

(2')

(3')

wherein $R^2$ and $—O_{1/2}—$ are as defined above, and wherein component (B) includes (B2) a radical polymerizable monomer having two or more radical polymerizable groups per molecule and further includes (B3) one or more types of monomer selected from the group consisting of: (B3-a) radical polymerizable silicone macromonomers of general formula (15) below

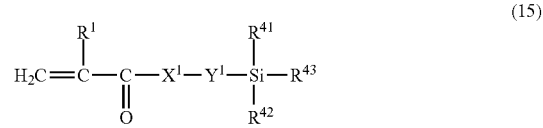

(15)

wherein $R^1$ is a hydrogen atom or a methyl group; $X^1$ is an oxygen atom, an NH group or a sulfur atom; $Y^1$ is a divalent hydrocarbon group of 1 to 12 carbon atoms which may have an intervening oxygen atom; and $R^{41}$ to $R^{43}$ are alkoxy groups of 1 to 4 carbon atoms, acetoxy groups, isopropenyloxy groups, oxime groups, alkyl groups of 1 to 20 carbon atoms or aryl groups of 6 to 20 carbon atoms, with at least one of $R^{41}$ to $R^{43}$ being selected from the group consisting of alkoxy groups of 1 to 4 carbon atoms and acetoxy, isopropenyloxy and oxime groups; (B3-b) radical polymerizable monomers of general formula (16) below

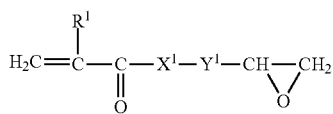

(16)

wherein $R^1$, $X^1$ and $Y^1$ are as defined above; and (B3-c) radical polymerizable monomers of general formula (17) below

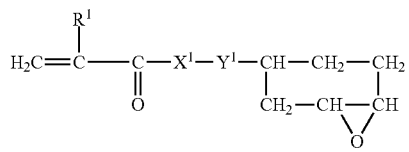

(17)

wherein $R^1$, $X^1$ and $Y^1$ are as defined above.

2. The tight release additive for a release sheet of claim 1, wherein $Z^1$ in formula (1) is a residue selected from the group consisting of monovalent silicone residues of general formulas (4a) to (4d) below

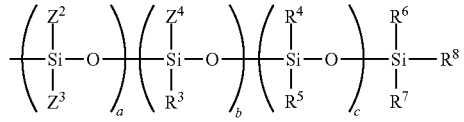

(4a)

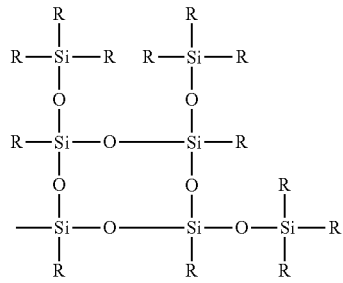

(4b)

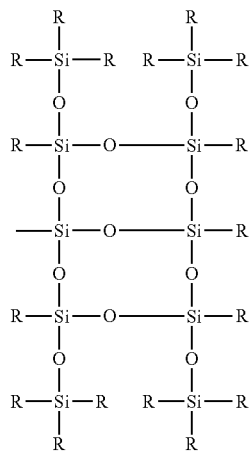

(4c)

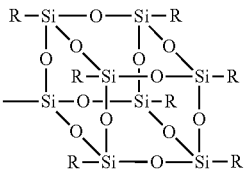

(4d)

wherein R and $R^3$ to $R^8$ are each independently a monovalent hydrocarbon group of 1 to 20 carbon atoms, $Z^2$ to $Z^4$ are each independently a monovalent group of general formula (5) below

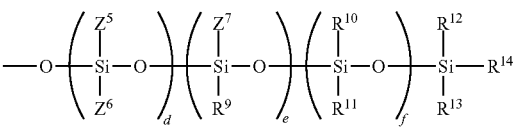

(5)

wherein $R^9$ to $R^{14}$ are each independently a monovalent hydrocarbon group of 1 to 20 carbon atoms, $Z^5$ to $Z^7$ are each independently a monovalent group of general formula (6) below

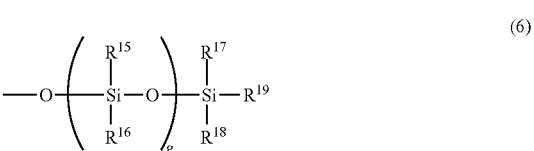

(6)

wherein $R^{15}$ to $R^{19}$ are each independently a monovalent hydrocarbon group of 1 to 20 carbon atoms, and g is an integer of 0 or more), and the subscripts d, e and f are each integers of 0 or more, and the subscripts a, b and c are each an integer of 0 or more and satisfy the condition $a+b \geq 1$.

3. The tight release additive for a release sheet of claim 1, wherein component (A) further includes as component (A2):

(A2-a) a radical polymerizable silicone macromonomer of general formula (7) below

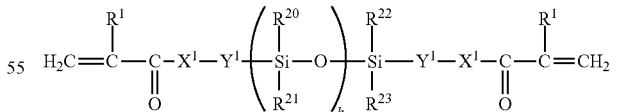

(7)

wherein $R^1$ is a hydrogen atom or a methyl group; $X^1$ is an oxygen atom, an NH group or a sulfur atom; $Y^1$ is a divalent hydrocarbon group of 1 to 12 carbon atoms which may have an intervening oxygen atom; $R^{29}$ to $R^{23}$ are each independently a monovalent hydrocarbon group of 1 to 20 carbon atoms; and h is an integer of 0 or more) and/or (A2-b) a radical polymerizable silicone macromonomer of general formula (8) below (8)

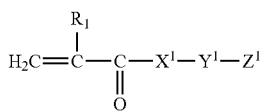

wherein $R^1$, $X^1$ and $Y^1$ are as defined above; and $Z^{11}$ is a residue selected from the group consisting of monovalent silicone residues of formulas (9a) to (9c) below (9a)

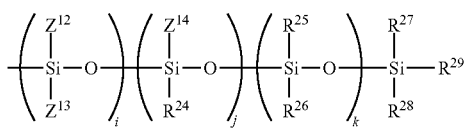

(9b)

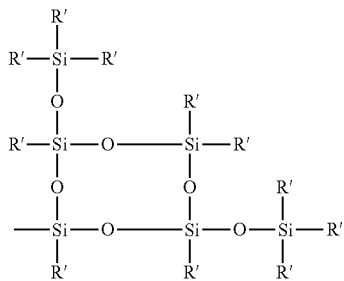

(9c)

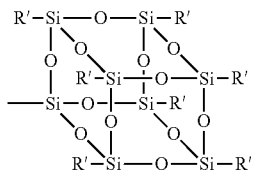

wherein R' and $R^{24}$ to $R^{29}$ are each independently a monovalent hydrocarbon group of 1 to 20 carbon atoms or a group of general formula (10) or (11) below (10)

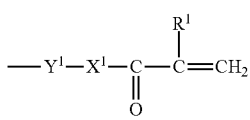

(11)

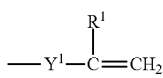

wherein $R^1$, $X^1$ and $Y^1$ are as defined above); $Z^{12}$ to $Z^{14}$ are each independently a monovalent group of general formula (12) below (12)

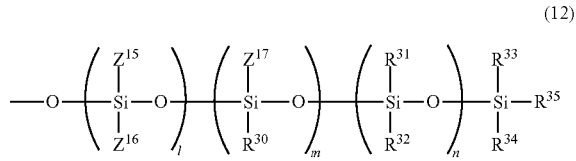

wherein $R^{30}$ to $R^{35}$ are each independently a monovalent hydrocarbon group of 1 to 20 carbon atoms or a group of general formula (10) or (11) above, $Z^{15}$ to $Z^{17}$ are each independently a monovalent group of general formula (13) below (13)

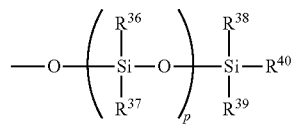

wherein $R^{36}$ to $R^{40}$ are each independently a monovalent hydrocarbon group of 1 to 20 carbon atoms or a group of general formula (10) or (11) above, and p is an integer of 0 or more, and the subscripts l, m and n are each an integer of 0 or more; and the subscripts i, j and k are each an integer of 0 or more and satisfy the condition i+j≥1, with the proviso that at least one of R' and $R^{24}$ to $R^{40}$ is a group of formula (10) or (11).

4. The tight release additive for a release sheet of claim 1, wherein component (B) further includes (B1) a (meth) acrylate which has one (meth)acrylic group per molecule and has no other aliphatic unsaturated group, no alkoxysilyl group and no epoxy group.

5. The tight release additive for a release sheet of claim 1, wherein the radical polymerizable monomer (B2) having two or more radical polymerizable groups per molecule has general formula (14) below and is included is an amount of at least 3 wt % of the combined amount of components (A) and (B)

(14)

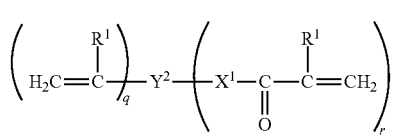

wherein each $R^1$ is independently a hydrogen atom or a methyl group; $X^1$ is independently an oxygen atom, an NH group or a sulfur atom; $Y^2$ is a hydrocarbon group of 1 to 12 carbon atoms which has a valence of at least 2 and may have an intervening oxygen atom; and the subscripts q and r are each integers of 0 or more, and satisfy the condition q+r≥2.

6. The tight release additive for a release sheet of claim 5, wherein the radical polymerizable monomer of component (B2) is selected from the group consisting of alkenyl group-containing methacrylates, alkenyl group-containing acrylates, polymethacrylates and polyacrylates.

7. The tight release additive for a release sheet of claim 1, wherein the radical polymerizable monomer of component (B3) is selected from the group consisting of methacrylates and acrylates, and the methacrylates and acrylates have an epoxycyclohexenyl group, a glycidyl group or a methoxysilyl group.

8. The tight release additive for a release sheet of claim 1 which is characterized in that the polymerization weight ratio (A)/(B) between component (A) and component (B) in the acrylic-silicone graft copolymer is from 30/70 to 99/1.

9. The tight release additive for a release sheet of claim 1, wherein the weight-average molecular weight of the acrylic-silicone graft copolymer is from 50,000 to 1,000,000.

10. An organopolysiloxane composition for a release sheet, comprising components (a) to (d) below:

(a) 100 parts by weight of an organopolysiloxane having two or more alkenyl groups per molecule;

(b) 1 to 70 parts by weight of, a tight release additive for the release sheet, an acrylic silicone graft copolymer having a weight-average molecular weight in the range 30,000 to 2,000,000, obtained by radical polymerizing: (A) an organopolysiloxane compound having a radical polymerizable group, and (B) a radical polymerizable monomer having an acrylic group and/or a methacrylic group, wherein component (A) includes (A1) an organopolysiloxane compound having one radical polymerizable group per molecule, (A1) being a radical polymerizable silicone macromonomer of formula (1)

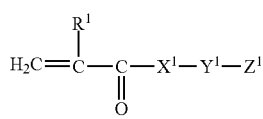
(1)

wherein $R^1$ is a hydrogen atom or a methyl group, $X^1$ is an oxygen atom, an NH group, or a sulfur atom, $Y^1$ is a divalent hydrocarbon group of 1 to 12 carbon atoms which may have an intervening oxygen atom, and $Z^1$ is a monovalent silicone residue having a branched, cyclic, or cage-like structure that includes at least one siloxane unit of formula (2) or of formula (3) below

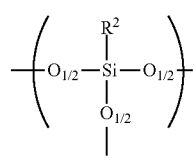
(2)

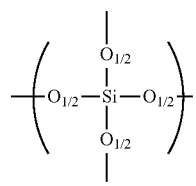
(3)

wherein $R^2$ is a monovalent hydrocarbon group of 1 to 20 carbon atoms, and —$O_{1/2}$— indicates bridging to another element through an oxygen atom, with the proviso that when siloxane unit (2) or (3) is adjacent to $Y^1$, it is a siloxane unit of, respectively, general formula (2') or (3') below

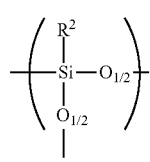
(2')

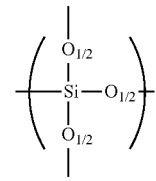
(3')

wherein $R^2$ and —$O_{1/2}$— are as defined above, and wherein component (B) includes (B2) a radical polymerizable monomer having two or more radical polymerizable groups per molecule;

(c) 0.1 to 50 parts by weight of an organohydrogenpolysiloxane having two or more silicon-bonded hydrogen atoms per molecule; and (d) a platinum group metal catalyst in a platinum metal weight, based on component (a), of from 10 to 1,000 ppm.

11. A release sheet comprising a sheet-like substrate and a cured coating formed by applying an organopolysiloxane composition comprising components (a) to (d) below:

(a) 100 parts by weight of an organopolysiloxane having two or more alkenyl groups per molecule;

(b) 1 to 70 parts by weight of, as a tight release additive for the release sheet, an acrylic silicone graft copolymer having a weight-average molecular weight in the range 30,000 to 2,000,000, obtained by radical polymerizing: (A) an organopolysiloxane compound having a radical polymerizable group, and (B) a radical polymerizable monomer having an acrylic group and/or a methacrylic group, wherein component (A) includes (A1) an organopolysiloxane compound having one radical polymerizable group per molecule, (A1) being a radical polymerizable silicone macromonomer of formula (j)

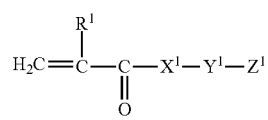
(1)

wherein $R^1$ is a hydrogen atom or a methyl group, $X^1$ is an oxygen atom, an NH group, or a sulfur atom, $Y^1$ is a divalent hydrocarbon group of 1 to 12 carbon atoms which may have an intervening oxygen atom, and $Z^1$ is a monovalent silicone residue having a branched, cyclic, or cage-like structure that includes at least one siloxane unit of formula (2) or of formula (3) below

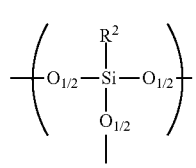
(2)

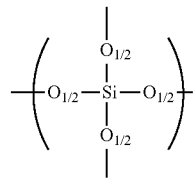

(3)

wherein $R^2$ is a monovalent hydrocarbon group of 1 to 20 carbon atoms, and $-O_{1/2}-$ indicates bridging to another element through an oxygen atom, with the proviso that when siloxane unit (2) or (3) is adjacent to $Y^1$, it is a siloxane unit of, respectively, general formula (2') or (3') below

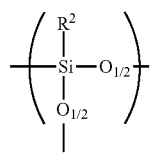

(2')

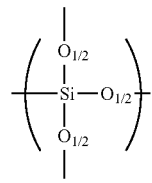

(3')

wherein $R^2$ and $-O_{1/2}-$ are as defined above, and wherein component (B) includes (B2) a radical polymerizable monomer having two or more radical polymerizable groups per molecule;

(c) 0.1 to 50 parts by weight of an organohydrogenpolysiloxane having two or more silicon-bonded hydrogen atoms per molecule; and (d) a platinum group metal catalyst in a platinum metal weight, based on component (a), of from 10 to 1,000 ppm onto one or both sides of the substrate and heating.

12. The release sheet of claim 11 which is characterized by exhibiting a release force of at least 1 N/10 mm when the release force of the cured coating is measured with TESA 7475 tape, and exhibiting a release force of at least 0.15 N/10 mm when measured with Nitto 31B tape.

\* \* \* \* \*